United States Patent
Munigala et al.

(10) Patent No.: US 11,314,584 B1
(45) Date of Patent: Apr. 26, 2022

(54) DATA QUALITY-BASED CONFIDENCE COMPUTATIONS FOR KPIS DERIVED FROM TIME-SERIES DATA

(71) Applicant: International Business Machines Corporation, Armonk, NY (US)

(72) Inventors: Vitobha Munigala, Secunderabad (IN); Diptikalyan Saha, Bangalore (IN); Sattwati Kundu, Bangalore (IN); Geetha Adinarayan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/105,036

(22) Filed: Nov. 25, 2020

(51) Int. Cl.
*G06F 11/00* (2006.01)
*G06F 11/07* (2006.01)
*G06N 5/04* (2006.01)
*G06F 16/23* (2019.01)

(52) U.S. Cl.
CPC ...... *G06F 11/0793* (2013.01); *G06F 11/0745* (2013.01); *G06F 11/0751* (2013.01); *G06F 16/2379* (2019.01); *G06N 5/04* (2013.01)

(58) Field of Classification Search
CPC .............. G06F 11/1402; G06F 11/1469; G06F 11/0793; G06F 11/0745; G06F 11/0751; G06F 16/2379; G06N 5/04
USPC ...................................................... 714/1–57
See application file for complete search history.

(56) References Cited

U.S. PATENT DOCUMENTS

| | | | |
|---|---|---|---|
| 6,745,353 B2 * | 6/2004 | Susnow | G06F 11/076 714/56 |
| 10,268,711 B1 | 4/2019 | Chappell | |
| 10,560,530 B2 | 2/2020 | Karjee | |
| 2004/0139372 A1 * | 7/2004 | Moyer | G06F 11/0793 714/E11.144 |
| 2009/0259922 A1 * | 10/2009 | Garudadri | G10L 19/005 714/799 |
| 2009/0281783 A1 * | 11/2009 | Bitar | G06F 11/3485 703/21 |
| 2010/0235681 A1 * | 9/2010 | Suetsugu | G06F 11/1471 714/15 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — Sarai E Butler
(74) *Attorney, Agent, or Firm* — Richard B. Thomas

(57) ABSTRACT

A system, computer program product, and method are presented for providing confidence values for replacement data for data that has issues indicative of errors, where the data issues, the replacement data, and confidence values are related to one or more KPIs. The method includes identifying one or more potentially erroneous data instances and determining one or more predicted replacement values for the potentially erroneous data instances. The method further includes determining a confidence value for each predicted replacement value and resolving the one or more potentially erroneous data instances with one predicted replacement value of the one or more predicted replacement values. The method also includes generating an explanatory basis for the resolution of the one or more potentially erroneous data instances.

20 Claims, 18 Drawing Sheets

(56) References Cited

U.S. PATENT DOCUMENTS

| | | | |
|---|---|---|---|
| 2013/0227343 A1* | 8/2013 | Peng | G06F 9/328 |
| | | | 714/6.13 |
| 2014/0149800 A1* | 5/2014 | Nishimaki | G06F 11/263 |
| | | | 714/40 |
| 2015/0378848 A1* | 12/2015 | Kaneko | H04L 41/0816 |
| | | | 714/19 |
| 2018/0113773 A1* | 4/2018 | Krishnan | G06F 11/008 |
| 2018/0225587 A1* | 8/2018 | Khidekel | G06Q 10/04 |
| 2019/0155672 A1* | 5/2019 | Wang | G06K 9/6284 |
| 2019/0251213 A1* | 8/2019 | Bishop | G06N 10/00 |
| 2019/0265971 A1 | 8/2019 | Behzadi | |
| 2019/0377623 A1* | 12/2019 | Ramachandran | G06N 20/00 |
| 2020/0065213 A1* | 2/2020 | Poghosyan | H04L 41/142 |
| 2020/0076675 A1* | 3/2020 | Morariu | H04L 41/0631 |
| 2020/0097810 A1 | 3/2020 | Hetherington | |
| 2021/0051503 A1* | 2/2021 | Bodiga | H04W 24/02 |
| 2021/0117263 A1* | 4/2021 | Dunne | G06F 11/302 |

* cited by examiner

↙600

Example Algorithm for Identifying Relevant Issues

(602) issues = ["missingValues", "missingTimestamps", "outliers", ...] ;

(604) data = data on which the KPI confidence needs to be computed ;

(606) KPI = formulation given by the user ;

(608) OriginalKPI = KPI(data) ;

(610) affectingIssues = [] ;

(612) foreach *issue in issues* do

(614) imputedData = impute data with 'issues" ;

(616) imputed KPI = KPI (imputedData) ;

(618) if *originalKPI ! = imputedKPI* then

(620) affectingIssues.add(issue)

(622) end

(624) end

FIG. 6

Example Algorithm for Observable Box KPI Analysis   ~700

(702) KPI = formulation provided by user ;

(704) parseTree = AST(KPI) foreach *node in parseTree* do

(706) if *node* == *"func"* then

(708) if *node.Attribute.attr* == *"median"* then

(710) KPICharacteristic = "median"

(712) end

(714) else if *node.Attribute.attr* == *"mean"* then

(716) KPICharacteristic = "mean"

(718) end

(720) end

(722) else if *node* == *"BinOp"* then

(724) if node.op == *"Div"* then

(726) if *node.left.func.Name.id* == *"sum"*

*node.right.func.Name.id* == *"len"* then

(728) KPICharacteristic = "mean"

(730) end

(732) end

(734) end

(736) ...

(738) end

FIG. 7

Example Algorithm for Unobservable Box KPI Analysis

(802) dataSubsets = $K$ subsets of data, each having $M$ points ;

(804) characteristics = ["mean", "median", "mode", "max", "min", ...] ;

(806) originalKPI = Get KPI value for each element in dataSubset ;

(808) correlations = dict() ;

(810) foreach P *in characteristics* do

(812) simulatedKPI = Get KPI value for each element in dataSubset using formulation P ;

(814) correlations[P] = correlation(originalKPI, simulatedKPI) ;

(816) end

(818) KPIcharacteristic = max(correlations) ;

(820) end

Example Algorithm for Snapshot Optimizer

(1202) KPIcharacterictic = characteristic of the KPI determined in the KPI Analysis step ;

(1204) data = data given by the user ;

(1206) if *KPICharacteristic* == *"max"* then

(1208) modifiedData = Fix outliers in the raising peaks and use only these points for simulation ;

(1210) end

(1212) else if *KPICharacteristic* == *"min"* then

(1214) modifiedData = Fix outliers in the falling peaks and use only these points for simulation ;

(1216) end

(1218) else if *KPICharacteristic* == *"mean"* then

(1220) modifiedData = Consider all the issues and group them based on the value distance ;

(1222) From each cluster consider a collection of representative points and use this collection of representative points for simulation ;

(1224) end

(1226) else if *KPICharacteristic* == *"median"* then

(1228) modifiedData = []since median is not affected by the value perturbations ;

(1230) end

FIG. 12

```
{'text': 'There were a total of 14 data points identified in the data which have issues.',
 'timestamps': {'missing': ['2019-03-02 00:00:00',
   '2019-03-03 00:00:00',
   '2019-03-30 00:00:00',
   '2019-03-31 00:00:00'],
  'outliers': ['2019-03-13 00:00:00',
   '2019-03-14 00:00:00',
   '2019-03-19 00:00:00',
   '2019-03-20 00:00:00',
   '2019-04-02 00:00:00',
   '2019-04-03 00:00:00',
   '2019-04-04 00:00:00',
   '2019-04-09 00:00:00',
   '2019-04-10 00:00:00',
   '2019-04-11 00:00:00']},
 'original_kpi': 42.177,
 'simulated_kpi_max': 42.548,
 'simulated_kpi_min': 41.805,
 'simulated_kpi_mean': 42.09092808851993,
 'simulations_generated': 1029}}
```

DATA QUALITY-BASED CONFIDENCE COMPUTATIONS FOR KPIS DERIVED FROM TIME-SERIES DATA

BACKGROUND

The present disclosure relates to computing a confidence value for corrected data within time-series data, and, more specifically, to providing confidence values for replacement data for data that has issues indicative of one or more errors, where the data issues, the replacement data, and confidence values are related to one or more key performance indicators (KPIs).

Many known entities, including business entities and residential entities, include systems that collect time series data from various sources such as Internet of Things (IoT) devices, smart home devices, human activity, device activity, etc. The collected data may be analyzed to facilitate energy conservation, occupancy allotment, etc. On occasion, a portion of the collected time series data may be erroneous due to various reasons such as a malfunction of a device being controlled, a respective sensing device malfunction, and issues with respect to the data collection systems, data storage systems, or data transmission systems.

SUMMARY

A system, computer program product, and method are provided for computing a confidence value for corrected data within time-series data.

In one aspect, a computer system is provided for computing a confidence value for corrected data within time-series data. The system includes one or more processing devices and at least one memory device operably coupled to the one or more processing devices. The one or more processing devices are configured to identify one or more potentially erroneous data instances in a time series data stream and determine one or more predicted replacement values for the one or more potentially erroneous data instances. The one or more processing devices are also configured to determine a confidence value for each predicted replacement value of the one or more predicted values and resolve the one or more potentially erroneous data instances with one predicted replacement value of the one or more predicted replacement values. The one or more processing devices are further configured to generate an explanatory basis for the resolution of the one or more potentially erroneous data instances.

In another aspect, a computer program product is provided for computing a confidence value for corrected data within time-series data. The computer program product includes one or more computer readable storage media, and program instructions collectively stored on the one or more computer storage media. The product also includes program instructions to identify one or more potentially erroneous data instances in a time series data stream. The product further includes program instructions to determine one or more predicted replacement values for the one or more potentially erroneous data instances. The product also includes program instructions to determine a confidence value for each predicted replacement value of the one or more predicted values. The product further includes program instructions to resolve the one or more potentially erroneous data instances with one predicted replacement value of the one or more predicted replacement values. The product also includes program instructions to generate an explanatory basis for the resolution of the one or more potentially erroneous data instances.

In yet another aspect, a computer-implemented method is provided for computing a confidence value for corrected data within time-series data. The method includes identifying one or more potentially erroneous data instances in a time series data stream. The method also includes determining one or more predicted replacement values for the one or more potentially erroneous data instances. The method further includes determining a confidence value for each predicted replacement value of the one or more predicted replacement values. The method also includes resolving the one or more potentially erroneous data instances with one predicted replacement value of the one or more predicted replacement values. The method further includes generating an explanatory basis for the resolution of the one or more potentially erroneous data instances.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

FIG. 6 is a textual diagram illustrating an algorithm for identifying relevant issues, in accordance with some embodiments of the present disclosure.

FIG. 7 is a textual diagram illustrating an algorithm for observable box KPI analysis, in accordance with some embodiments of the present disclosure.

FIG. 8 is a textual diagram illustrating an algorithm for unobservable box KPI analysis, in accordance with some embodiments of the present disclosure.

FIG. 12 is a textual diagram illustrating an algorithm for a snapshot optimizer, in accordance with some embodiments of the present disclosure.

FIG. 16 is a textual diagram illustrating confidence measures explanations, in accordance with some embodiments of the present disclosure.

Figure 1:
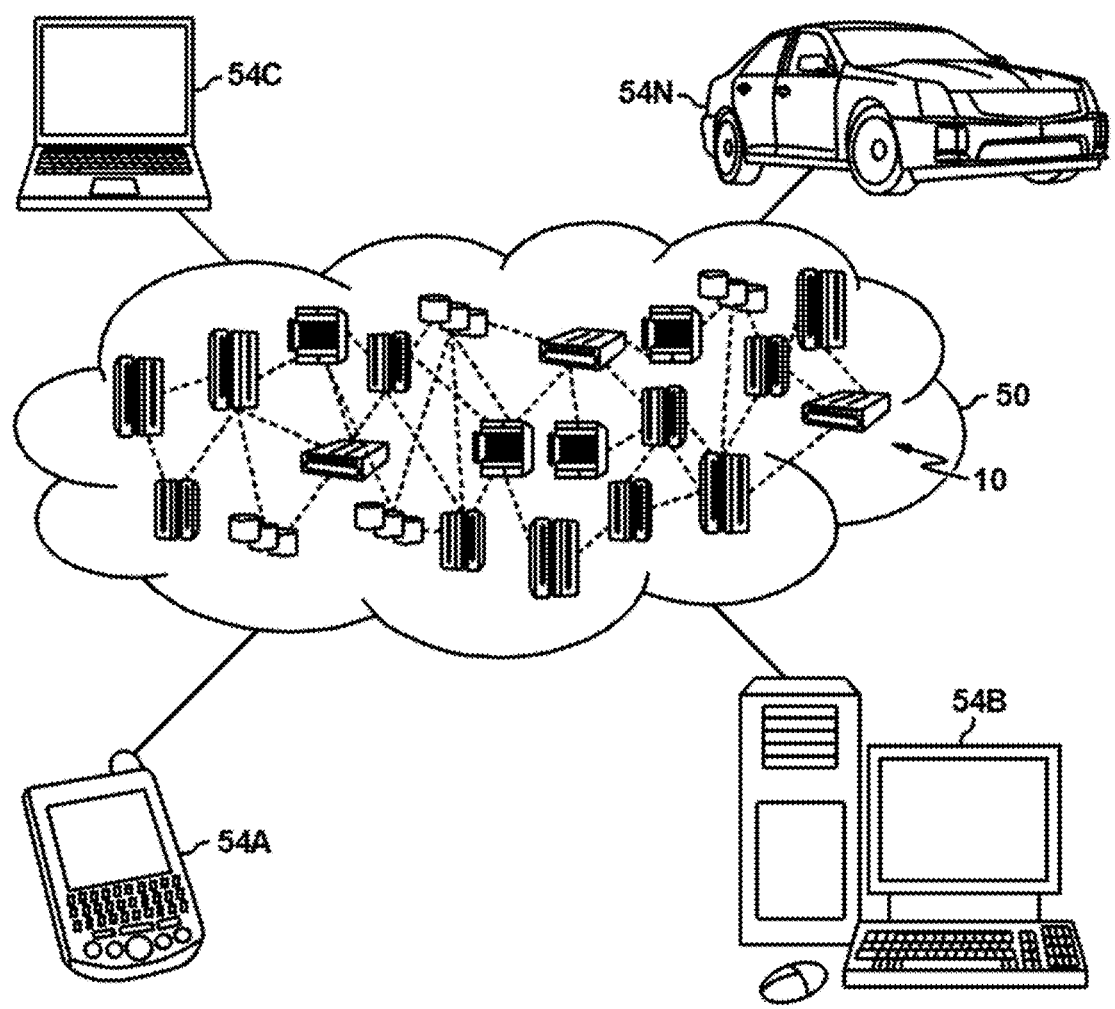
FIG. 1 is a schematic diagram illustrating a cloud computer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
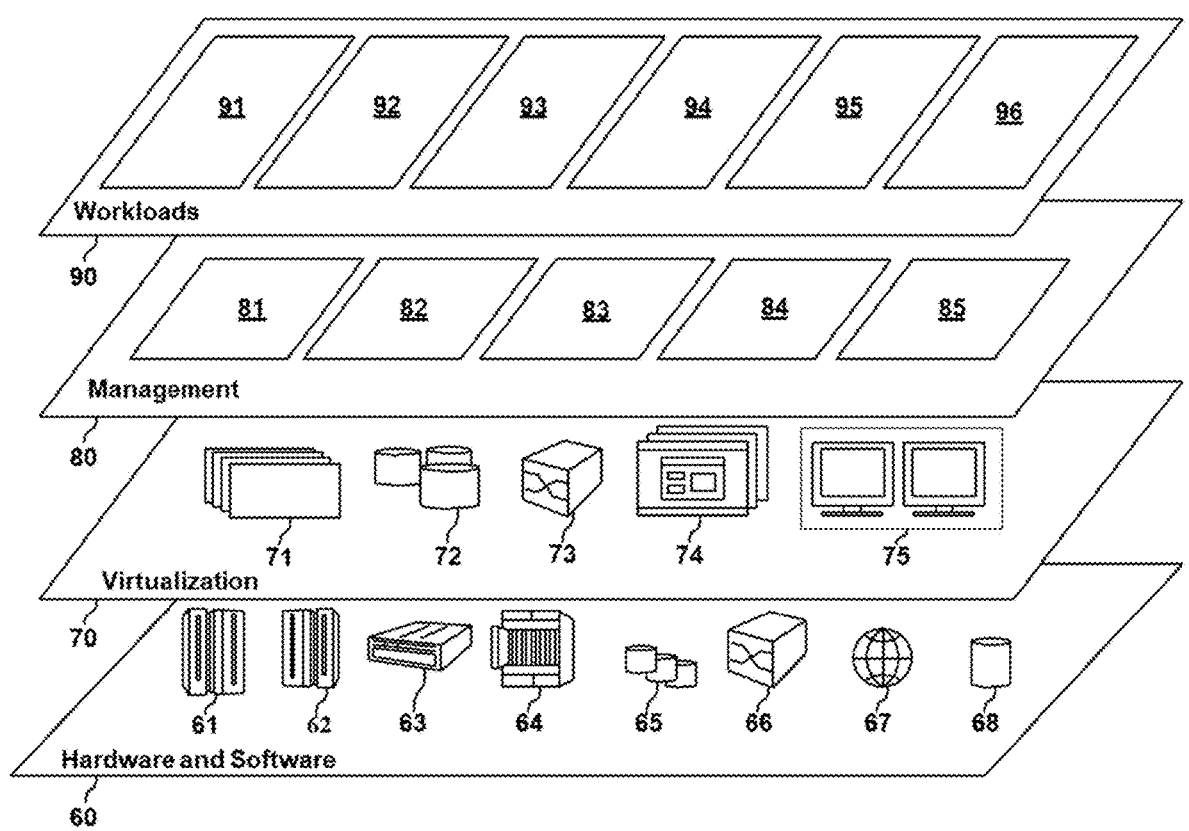
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computing a confidence value for time-series data 96.

Figure 3:
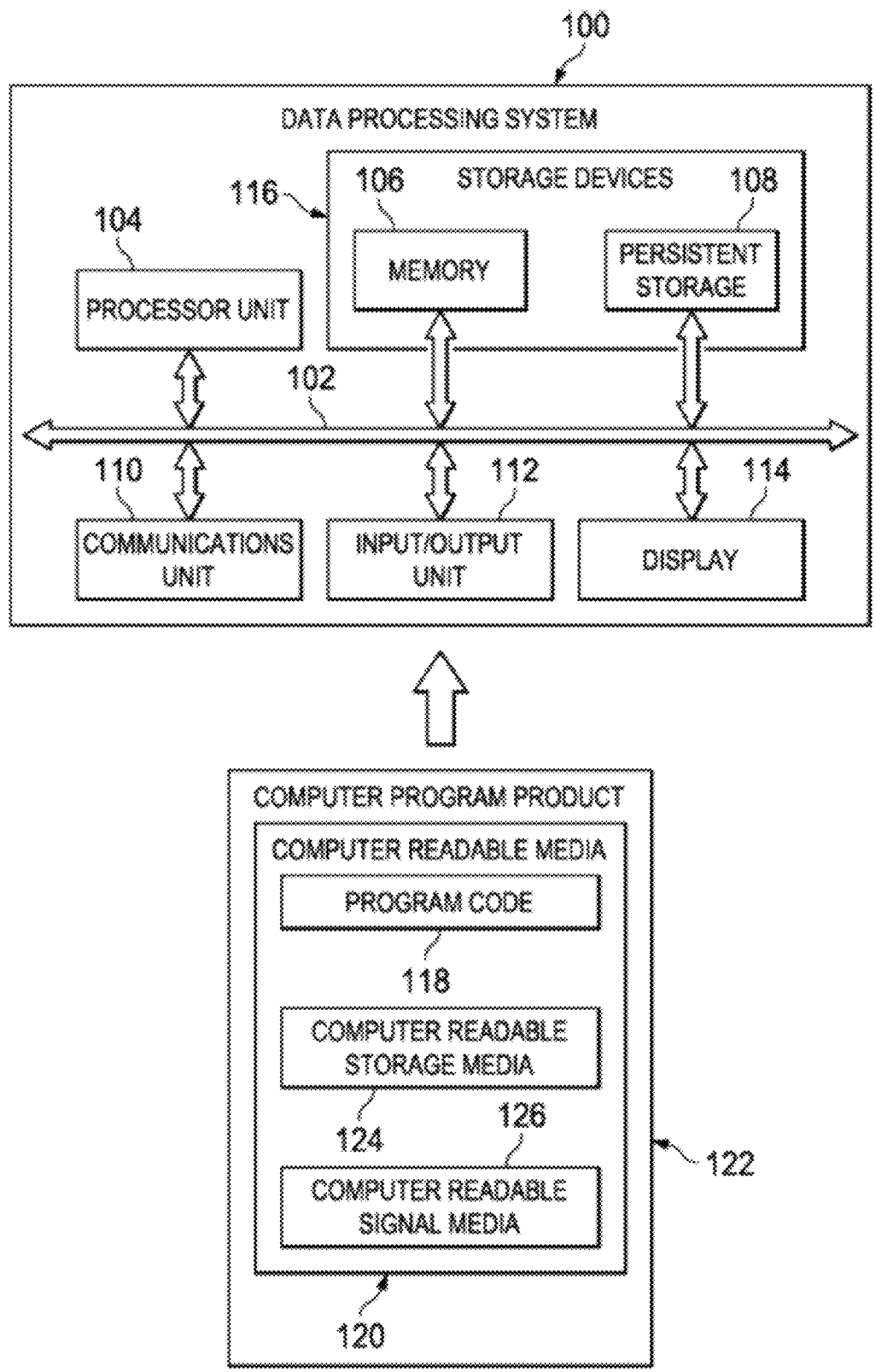
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100, is provided. System 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106 (sometimes referred to as a memory device), and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multiprocessor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many known entities, including business entities and residential entities, include systems that collect time series data from various sources such as Internet of Things (IoT) devices, smart home devices, human activity, device activity, etc. The collected data may be analyzed to facilitate energy conservation, occupancy allotment, etc. On occasion, a portion of the collected time series data may be erroneous due to various reasons such as a malfunction of a device being controlled, a respective sensing device malfunction, and issues with respect to the data collection systems, data storage systems, or data transmission systems. For example, in one embodiment, an occupancy management system assesses electrical power usage with respect to a peak load value, and, in response to an erroneous occupancy data value, to avoid peak usage charges, may erroneously initiate de-energization of predetermined devices in the associated spaces.

Also, many known entities possess one or more key performance indicators (KPIs), where, as used herein, KPI refers to one or more measurable indicators associated with one or more key objectives. The KPIs facilitate achieving the key objectives through evaluations of success at meeting those key objectives. KPIs are scalable in that enterprise-wide KPIs may be used as well as lower level, suborganization-specific KPIs, e.g., sales, marketing, HR, IT support, and maintenance KPIs may be used. In some embodiments, the KPIs are explicitly identified and described in one or more documents, and in some embodiments, the KPIs become evident as a function of analysis of the collected data, where "hidden" KPIs may be "discovered," and previously stated KPIs may be verified.

A system, computer program product, and method are disclosed and described herein directed toward collecting time series data from one or more sensor devises. In some embodiments, the system includes a data quality-to-KPI predictions confidence engine. The collected time series data is referred to herein as "the original data" and "the original time series data streams." Unless otherwise indicated, each stream of time series data, as discussed herein for the various embodiments, originates from a single sensing device, or from a plurality of sensors where the stream is either a combination, e.g., an aggregation of the outputs from the respective sensors or an output from one sensor of the plurality of sensors that has been auctioned or otherwise selected. Also, unless otherwise indicated, the system as described herein is configured to simultaneously analyze a plurality of data streams without limitation as to the number of data streams. Accordingly, the system as described herein is configured to analyze individual data streams.

In one or more embodiments, the quality of the data embedded within the respective data streams is analyzed and a determination is made as to the respective one or more KPIs that are related to the respective data through a two-step process. Initially, the quality of the original data as data packets are transmitted from the sensors to a data inspection module, where the data packets are inspected by a data inspection sub-module embedded within the data inspection module. In some cases, one or more data packets may include issues that identify the respective data packets as containing potentially faulty data. One such issue may be associated with the sampling frequency. For example, and without limitation, the data inspection sub-module checks the sampling frequency of the data sensors to determine if multiple sampling frequencies are present in the data, e.g., if there are occasional perturbations in the sampling frequency, and if there are continuous sampling frequency changes. Also, for example, and without limitation, the data inspection sub-module checks the timestamps of the data to determine if any timestamps are missing in the data, if the data is missing for a continuous extended duration, and if there are timestamps of varied formats. Moreover, for example, and without limitation, the data inspection sub-module checks for syntactic value issues to determine if supposedly numeric data includes extensive durations of data that is "not-a-number (NaN)" and improper numerical rounding and truncation. In addition, for example, and without limitation, the data inspection sub-module checks for semantic value issues to determine if any of the data includes anomalous events, and noisy data. Accordingly, the data inspection sub-module examines the data in the streams and determines if the data is within predetermined tolerances and if there are any suspected errors in the data, and the nature of the errors.

In some embodiments, there are two modalities, i.e., processing of the original data the system is trying to operate on to determine data quality (as described above), and determining one or more KPI formulations that are planned to be applied on the data. As used herein, the KPI formulations include one or more KPI characteristics, where the KPI characteristics also include, without limitation, the details of the formulation, e.g., and without limitation, one or more data issues the algorithms of the formulations are directed to, the algorithms themselves, and any parameters and definitions of the respective KPIs. In some embodiments, both modalities are executed through the data inspection module, i.e., the data quality is evaluated through the data inspection sub-module and the KPI-characterized formulation evaluations are executed through a KPI characteristic determination sub-module that is operably coupled to the data inspection sub-module. In some embodiments, the KPI characteristic determination sub-module is a separate module operably coupled to the data inspection module. Accordingly, the data inspection features and the determination of the relevant KPI formulation characteristics are closely integrated.

In at least some embodiments, at least a portion of such KPI formulation characteristics are typically implemented as algorithms to operate on the incoming data streams to provide a user with the necessary output data and functionality to support the respective KPIs. Also, in some embodiments, the KPI formulations are readily located within a KPI formulations sub-module embedded within the KPI characteristic determination sub-module. Therefore, as previously described, the data is initially checked to verify it is within certain tolerances, and then secondly, a determination is made if there is any association of the potentially erroneous data with one or more particular KPIs. In one or more embodiments, at least a portion of the collected original data is not associated with any KPIs, and therefore, such erroneous original data is not impactful for a given KPI. Therefore, in order to execute an initial identification of relevant issues, a simple KPI relevancy test is performed. For example, and without limitation, if one or more particular KPIs use an average-based formulation, and the potentially erroneous data in the respective data streams includes unordered timestamps, it is determined that the unordered timestamps do not create any impact on the respective one or more KPIs. Similarly, if one or more particular KPIs are median- or mode-based formulations, then the presence of outliers in the respective data streams do not create any impact on the respective KPIs. Accordingly, some erroneous data attributes may have no effect on a particular KPI, and such data is not relevant for the KPI-related analyses described further herein.

In some embodiments, one further mechanism for determining KPI relevancy that may be employed is to pass at least a portion of the original time series data streams with known non-erroneous data, and, in some embodiments, suspect erroneous data, to one or more respective KPI formulations in the KPI formulations sub-module to generate numerical values therefrom, i.e., to generate original KPI test values therefrom. Specifically, data with no erroneous values may be manipulated to change at least one value to a known erroneous value, thereby generating imputed error-laden data that is also passed to the respective one or more KPIs to generate imputed KPI test values therefrom. In some embodiments, the injected errors may include, without limitation, random selection of some of the data in the original data stream and removal of such random data to determine if missing data issues are relevant, and random selection of known non-erroneous data and injecting values that are known to extend beyond established tolerances to determine if outlier issues are relevant. The imputed KPI test values are compared to the original KPI test values and if there is sufficient similarity therebetween, then the original data, i.e., the issues associated with the original data, are labeled as relevant to the respective KPIs. If there is insufficient similarity between the imputed KPI test values and the original KPI test values, then the original data, including the aforementioned issues, are labeled as not relevant to the respective KPIs. Accordingly, in order to determine if there are any relevant relationships between the suspected, or otherwise identified, data errors in the original data stream, data with predetermined errors embedded therein is used for determining if there is any relevant and appreciable effect of the erroneous data on the respective KPI formulations.

In at least some embodiments, a KPI characteristic determination is performed. The basis for each KPI characteristic determination, sometimes referred to as KPI characterization, includes one or more KPIs, e.g., for a business, one or more business-specific KPIs, and for a private residence, one or more residential-specific KPIs. In some embodiments, the KPIs are predetermined and described, e.g., as explicit measurements of success, or lack thereof, toward attaining specific business goals. In some embodiments, the KPIs are developed as a function of collection and analysis of business data to determine otherwise unidentified measurements for attaining business goals, thereby facilitating the identification of one or more additional KPIs. Accordingly, regardless of the origins, the KPIs are available to match the associated inherent properties within the KPIs to the respective issues found in the original data, and in some instances, facilitate identification of the relevant issues.

In one or more embodiments, the KPI characteristic determination operations are executed in situ as the original data is transmitted into the data inspection module. Moreover, since the nature of the original data issues generated in real time are not known in advance, the data inspections and KPI characteristic determinations are to be made dynamically in real time. Therefore, the determinations of the respective KPIs with the respective characteristics that are embedded within the respective formulations of the respective KPIs are executed in conjunction with the determinations of the issues affecting the incoming original data. At least a portion of the KPI characteristic determinations include determining the nature of the respective KPIs associated with the original data. In some embodiments, a portion of the incoming original data will not be associated with any KPIs, and this data will not be operated on any further for this disclosure and any embedded issues will be either ignored and the data processed as is, or an issue notification will be transmitted to the user in one or more manners. In other embodiments, the relationships of the incoming original data and the associated KPI formulations will be further determined.

In embodiments, the KPI formulations are grouped into one of two types of formulations, i.e., "observable box" and "unobservable box" formulations. The observable box KPI formulations are available for inspection, i.e., the details are observable, and the KPI characteristic determination sub-module includes a observable box sub-module. The unobservable box KPI formulations are opaque as to the operations and algorithms contained therein, for example, and without limitation, the respective unobservable box algorithms and operations may be proprietary in nature and the respective users require some level of secrecy and confidentiality for the contents thereof. The KPI characteristic determination sub-module includes a unobservable box sub-module. In some embodiments of both of the observable box and unobservable box KPI formulations, the associated algorithms examine whether the appropriate KPI characteristic formulation includes one or more analyses of the surrounding original data values with respect to the data with issues, including, without limitation, one or more of maximum value determinations, minimum value determinations, mean value determinations, median value determinations, and other statistical determinations, such as, and without limitation, standard deviation analyses. As previously discussed, if there is no relationship between the respective original data and the KPI formulations characteristic, no further action is taken on the issue-laden data per this disclosure. Accordingly, for those issues associated with original data that has a relationship with a KPI (both supplied by the user), the properties, i.e., the characteristics of the KPI formulations, whether observable box or unobservable box, are determined so that the relevant data quality issues that may adversely impact a related KPI can be properly classified and the subsequent optimizations can be performed.

In one or more embodiments, a snapshot generator module receives the outputs of the data inspection module that include the erroneous data with the known embedded issues and the respective KPI formulation characteristics. The snapshot generator module is configured to generate snapshots of simulated data through simulation of the respective data values through one or more models that are placed into production to facilitate the simulation of the original data. In some embodiments, method-based simulations and point-based simulations are used. While either of the simulations may be used regardless of the nature of the issues in the erroneous data, including both simultaneously, in some embodiments, the selection of which of the two simulations is based on the nature of the original data quality issues, and in some embodiments, the selection may be based on predetermined instructions generated by the user. However, in general, the method-based simulations are better configured for processing missing value issues and the point-based simulations are better configured for processing outlier value issues.

For example, in some embodiments, previous trial runs by a user may have indicated that missing data may be determined based on if data is missing for a continuous extended duration or syntactic value issues exist, i.e., supposedly numeric data includes extensive durations of data that is NaN or improper numerical rounding or truncation is determined. As such, the method-based simulations may provide the better analyses for the aforementioned conditions. Outlier value issues may be determined if there are semantic value issues, i.e., some of the data includes anomalous events or consistently or patterned noisy data. As such, the point-based simulations may provide the better analyses for the aforementioned conditions. Similarly, if a user determines that it may be indeterminate if the method-based or point-based simulations provide better simulations for the specified conditions, for those conditions when either may provide better simulations, and as described above, both simulation methods may be used.

The snapshot generator module is configured to use method-based simulations to analyze for one or more methods of remediation, where each method of remediation may include, for example, and without limitation, algorithms for determining means, medians, etc. In addition, a method-based simulations sub-module may be used whether or not the KPI formulation characteristics are unobservable box or observable box. Each method of remediation includes generation of one or more imputed values that are included in the respective simulation snapshot as potential solutions to, or replacements for, the erroneous values if that particular method of remediation were to be used. Notably, the imputed values may, or may not, be potential replacement values. Since there are no predetermined notions as to which of the methods of remediation provides the best, or most correct, replacement values for the particular present conditions, a plurality of models are used, where each model is used to execute the respective method of remediation. In some embodiments, the method-based simulations sub-module is communicatively coupled to the KPI formulations sub-module. Also, the fraction of non-erroneous data used to compute the imputed values for the erroneous data depends on the particular remediation technique. For example, if it is determined to replace a missing value with the mean of all values, then a substantially complete set of respective data is used in the remediation module. Alternatively, if only the surrounding three values are used to compute the missing value, then only those surrounding values are used by the remediation module. Accordingly, method-based simulations are used to generate one or more simulation snapshots of the non-erroneous original data and imputed values for each erroneous original data value, where each simulated value indicates what the data value would look like when the particular remediation method is used, thereby generating a plurality of imputed values, each imputed value a product of a different remediation method.

In at least some embodiments, data collection includes use of heuristically-based features that facilitate determinations of patterns in the data points as they are collected. As used herein, the term "data point" and the term "data element" are used interchangeably. Under some circumstances, one or more instances of the original data may appear to be incorrect due to the respective data points exceeding a threshold value that is based on a probability of what the data point value should be as a function of the established data patterns. For example, and without limitation, an apparent data excursion, i.e., a data spike upwards or downwards, may be generated through either an erroneous data packet or as a function of an accurate portrayal of what is occurring in real time. Therefore, the snapshot generator module is further configured to use point-based simulations to analyze the errors to determine if apparently erroneous data is actually erroneous data.

In one or more embodiments, the data, including the known correct original data and the suspect potentially erroneous data points, is combined into various configurations to initiate determinations of probabilities of whether the potentially erroneous data values are correct or erroneous. Each potentially erroneous data value is individually inferred as either a discrete "correct" or a discrete "erroneous," and the potentially erroneous data values are then referred to as "inferred data points" to distinguish them from the known correct original data. As such, the inferred data points have an original data value as transmitted and an inferred label as either correct or erroneous. The remainder of the analysis focuses exclusively on the inferred data points. Specifically, the full range of all of the possible combinations of the inferred data points collected in the aforementioned simulation snapshot are evaluated. The generation of all possible combinations of discrete "correct" labels and discrete "erroneous" labels and subsequent aggregation of such facilitates further determinations of "best" actions, whether those actions are to correct erroneous data or to accept correct data. These operations consider the accepted inaccuracies associated with original data that may or may not be erroneous, through determining the probabilities of one or more of the suspect potentially erroneous data values being "correct" or "erroneous." For example, and without limitation, for an instance where there the erroneous data points, $2^3$, or 8 combinations are generated by the point-based simulation. In each of the combinations, it is assumed that some of the erroneous values are wrongly identified and some are correctly identified as erroneous. So, for each combination, the erroneous values are replaced with an imputed value based on a predetermined remediation method. Therefore, each combination has a different set of correct and incorrect data points and require different imputed values based on the predetermined remediation technique.

The total number of each possible combination of the discrete "correct" and "erroneous" inferred data points grows exponentially with the number of inferred data points (i.e., $2^x$, where x=the number of inferred data values), and generating all possible combinations and processing them can be time and resource intensive. Each combination of inferred data points is a potential simulation, and processing each of the combinations as a potential simulation merely increases the processing overhead. Therefore, the described possible combinations of inferred data points are further considered; however, the possible combinations of inferred data points are "pruned" such that only a subset of all possible combinations are further considered. Therefore, the point-based simulations sub-module is operatively coupled to a snapshot optimization sub-module. In such embodiments, snapshot optimization features are employed through using the KPI formulation characteristics determined as previously described, whether or not the KPI formulation characteristics are unobservable box or observable box. For example, and without limitation, KPI formulation characteristics for maximum, minimum, mean, and median analyses may be used to filter the simulations of the inferred data points. Therefore, the snapshot optimization module is communicatively coupled to the KPI formulations sub-module. In general, only those combinations of inferred data points with the imputed values that successfully pass through the pruning process will survive to generate the respective simulations of the suspect point values through the models and generate the respective simulation snapshots with the non-erroneous original data and imputed values for the identified erroneous data, where a portion of the suspected erroneous point values may in fact not be erroneous and will not require replacement thereof.

In at least some embodiments, the simulation snapshots created by the snapshot generator modules, whether method-based or point-based, are transmitted to a KPI value inference module. As discussed above, each simulation snapshot includes the non-erroneous original data and imputed values for the erroneous data. Each of the imputed values and the associated original data are presented to the respective KPI formulation to generate a predicted replacement value, i.e., an inferred snapshot value for each of the imputed values in the respective simulation snapshots. Each inferred snapshot value is at least partially based on the respective KPI formulation within the context of the non-erroneous original data on the time-series data stream. Therefore, for each simulation snapshot transmitted to the KPI value inference module, one or more predicted replacement values, i.e., inferred snapshot values, are generated.

In some embodiments, the inferred snapshot values are transmitted to a confidence measures module to generate analytical scores in the form of confidence values (discussed further below) for each of the inferred snapshot values. For each respective scored inferred snapshot value for the erroneous data, a best confidence value is selected, and the respective inferred snapshot value is now elevated to the selected KPI value to replace the erroneous data, where the selected KPI value is referred to as the inferred KPI value. Accordingly, the inferred KPI value is that value selected from one or more predicted replacement values (i.e., the inferred snapshot values) to resolve the potentially erroneous data instances.

In one or more embodiments, in addition, the confidence measures module receives the respective information to facilitate the selection of the inferred KPI value and additional information to generate an explanation of the inferred KPI value that was selected. In general, the confidence measures module compares the inferred snapshot values generated through one or more of the aforementioned simulations with the respective original erroneous data. At least one of the results of the comparison are the respective confidence values, in the format of numerical values, for each of the inferred snapshot values. The respective confidence values as applied to the respective snapshots of the data are indicative of a predicted level of confidence that the respective inferred snapshot values are correct. A relatively low confidence value indicates that either the respective inferred snapshot value, including the inferred KPI value, should not be used, or used with caution. A relatively high confidence value indicates that the respective inferred snapshot values, including the inferred KPI value, should be used. The threshold values for the associated confidence values may be established by the user, and may also be used to train one or more models, both conditions to facilitate fully automating the selection. Furthermore, the subsequent actions may be automated. For example, and without limitation, for confidence values below a predetermined threshold, the respective inferred snapshot values will not be passed for further processing within the native application utilizing the original data stream. Similarly, for confidence values above a predetermined threshold, the respective selected inferred KPI value will be passed for further processing within the native application utilizing the original data. Accordingly, the systems and methods as described herein correct the issues with the erroneous data in the original data stream automatically in a manner that prevents inadvertent actions or initiates proper actions as the conditions and correct data dictate.

In addition, since it is possible that the confidence value for the inferred KPI value is not 100%, the confidence measures module includes an explanatory sub-module to provide an explanatory basis for the resolution of the one or more potentially erroneous data instances through providing the details and evidence of the selection of the particular simulated snapshot with the inferred KPI value. The explanatory sub-module provides such details including, and without limitation, the types of issues detected in the dataset, the number and nature of the simulations generated, the statistical properties of the scores obtained from various simulations, and a comparison of the scores. Accordingly, the confidence measures module generates various values for the simulated snapshots from the KPI value inference module and the information to facilitate the user understanding the properties of the distribution of the values to further provide clarity of the selection of the respective inferred KPI values.

In some embodiments, the confidence measures module also includes a plurality of additional sub-modules to facilitate generating the aforementioned confidence values and the details and evidence to support such values. In some of those embodiments, three confidence measures sub-modules are used, i.e., a quantity-based confidence measures sub-module, a spread-based confidence measures sub-module, and a quantity- and spread-based confidence measures sub-module.

The quantity-based confidence measures sub-module is configured to take into consideration the magnitude of the values obtained from the KPI value inference module and generate the associated confidence measures information, e.g., whether the magnitude of the KPI value is 50 or 1050, the confidence in the resultant KPI value may differ in light of the additional data and circumstances. The spread-based confidence measures sub-module considers the range in which the simulated values lie and generate the associated confidence measures information, i.e., instead of the absolute magnitude of the KPI values, the spread-based confidence measures use the statistical properties like mean, min, max, and standard deviation of the KPI values, and hence are substantially unaffected by the magnitude. The quantity- and spread-based confidence measures sub-module considers the magnitude as well as the range of values to generate the associated confidence measures information.

Figure 4:
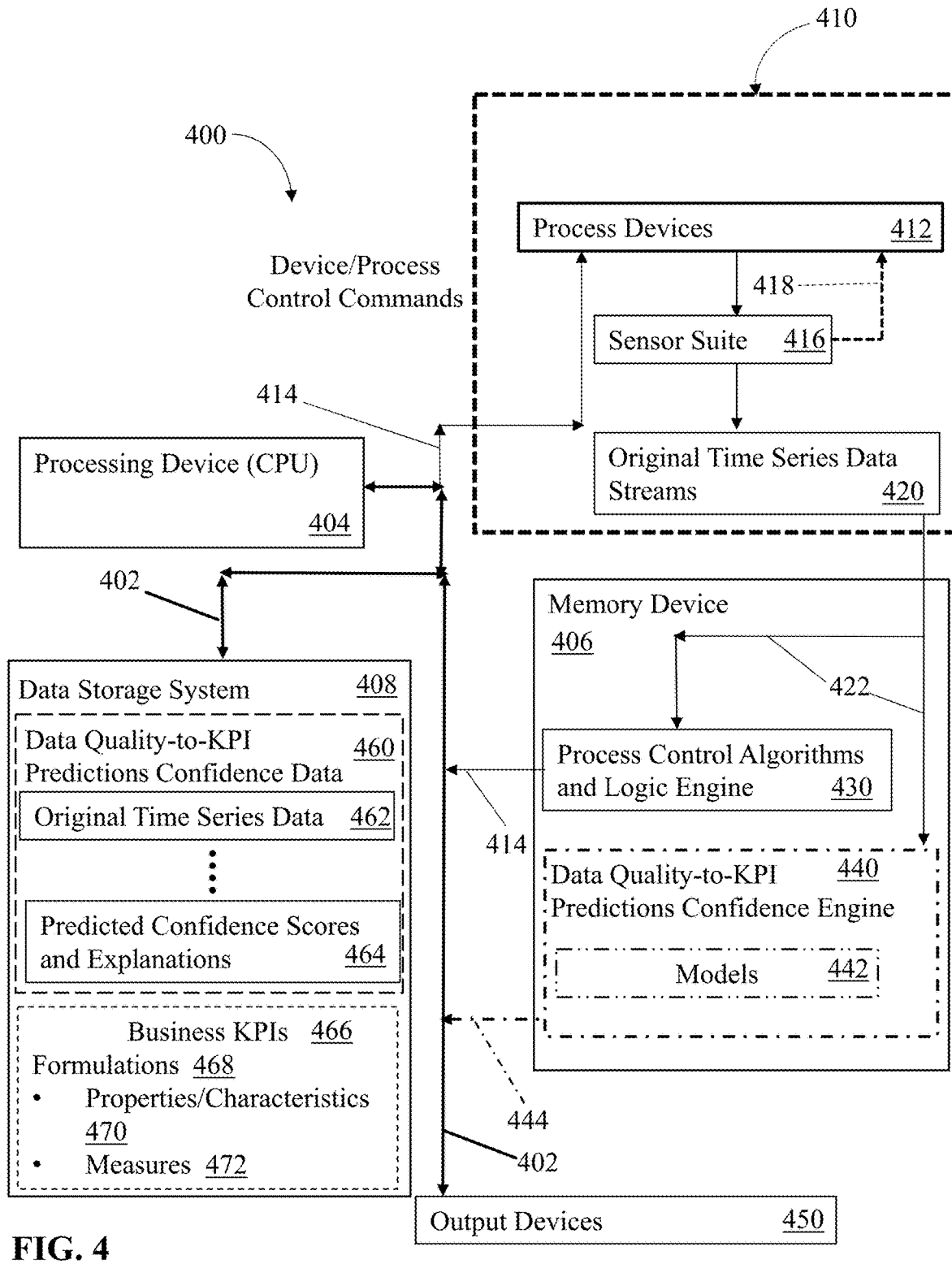
FIG. 4 is a schematic diagram illustrating a system to compute a confidence value for corrected data within time-series data, in accordance with some embodiments of the present disclosure.

Referring to FIG. 4, a schematic diagram is provided illustrating a system, i.e., a time-series data replacement confidence system 400 configured to compute a confidence value for corrected data within time-series data. The time-series data replacement confidence system 400 is referred to hereon as "the system 400" with reference to any but the time-series data replacement confidence system 400 identified. The system 400 includes one or more processing devices 404 (only one shown) communicatively and operably coupled to one or more memory devices 406 (only one shown). The system 400 also includes a data storage system 408 that is communicatively coupled to the processing device 404 and memory device 406 through a communications bus 402. In one or more embodiments, the communications bus 402, the processing device 404, the memory device 406, and the data storage system 408 are similar to their counterparts shown in FIG. 3, i.e., the communications bus 102, the processing device 104, the system memory 106, and the persistent storage devices 108, respectively.

In one or more embodiments, the system 400 includes a process control system 410 that is configured to operate any process that enables operation of the system 400 as described herein, including, without limitation, electrical processes (e.g., energy management systems), mechanical processes (machinery management systems), electro-mechanical processes (industrial manufacturing systems) and financial processes. In some embodiments, the process control system 410 is an external system communicatively coupled to the system 400. As shown and described herein, the processing device 404, memory device 406, and the data storage system 408 are communicatively coupled to the process control system 410 through, in some embodiments, the input/output unit 112 (shown in FIG. 3).

The process control system 410 includes one or more process devices 412 interfaced with the respective one or more processes, where the process devices 412 execute device/process control commands 414 generated through the interaction of the associated programming instructions through the processing device 404 and memory device 406. The process control system 410 also includes a sensor suite 416 that includes the sensors used to monitor the process devices 412 and the respective processes, generate feedback 418 to the process devices 412 (e.g., and without limitation, "sensor operating normally" and "sensor malfunction" signals, and one or more original time series data streams 420 that include data packets, hereinafter referred to as original data 422 representative of the process measurement outputs of the sensor suite 416.

The memory device 406 includes a process control algorithms and logic engine 430 that is configured to receive the original time series data streams 420 to generate the device/process control commands 414. Also, in some embodiments the memory device 406 includes a data quality-to-KPI predictions confidence engine 440. In one or more embodiments, the data quality-to-KPI predictions confidence engine 440 includes one or more models 442 embedded therein. The system 400 also includes one or more output devices 450 communicatively coupled to the communications bus 402 to receive an output 444 of the data quality-to-KPI predictions confidence engine 440. Modules and sub-modules of the data quality-to-KPI predictions confidence engine 440 are discussed with respect to FIG. 5

The data storage system 408 stores data quality-to-KPI predictions confidence data 460 that includes, without limitation, original time series data 462 (captured through the original time series data streams 420) and confidence values and explanations 464. The data storage system 408 stores also stores the business KPIs 466 including formulations 468, properties and characteristics 470 (used interchangeably herein), and respective measures 472, where the formulations 468 include the characteristics 470 and measures 472.

Figure 5A:
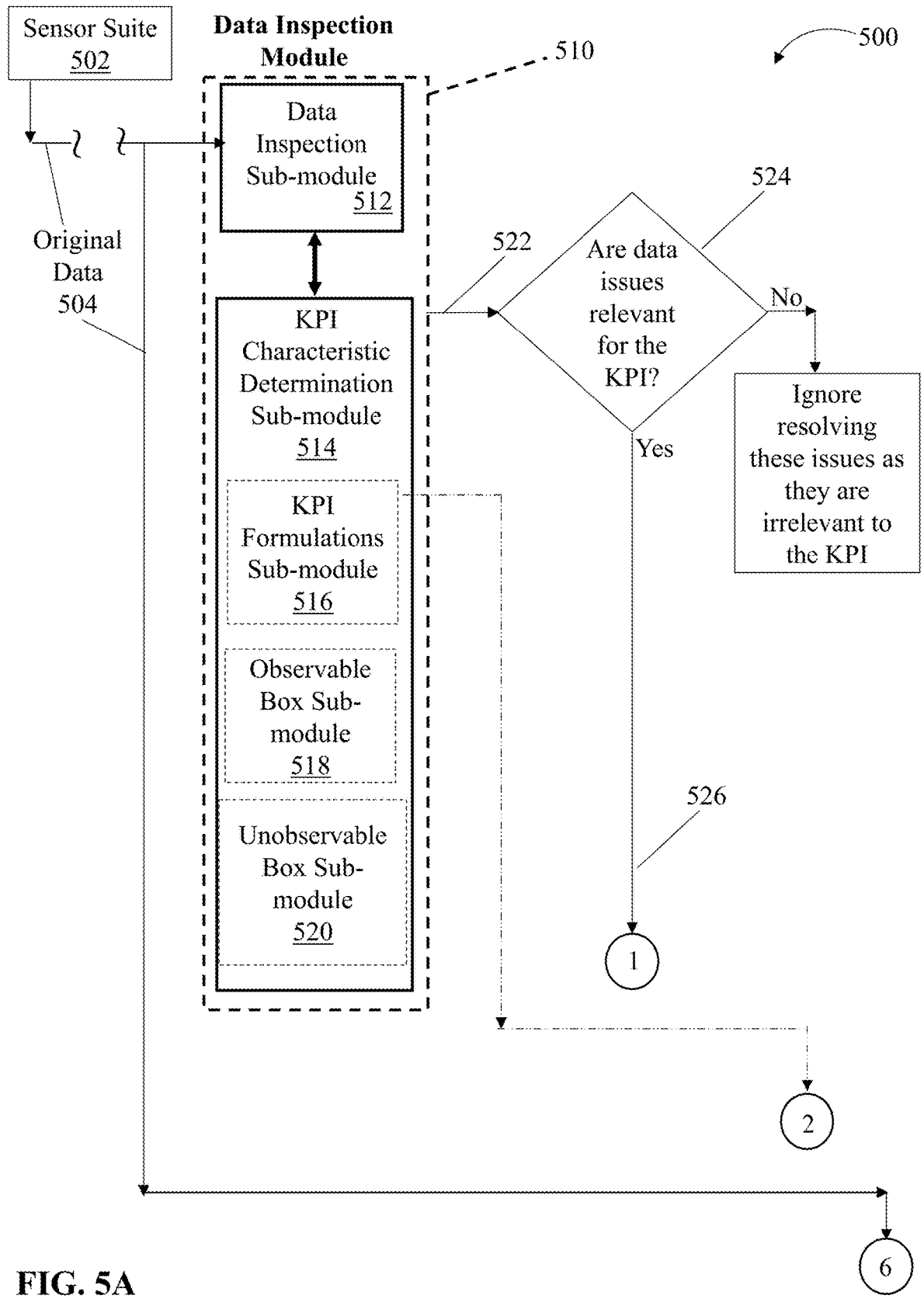
FIG. 5A is a flowchart illustrating a process for computing a confidence value for corrected data within time-series data, in accordance with some embodiments of the present disclosure.

Referring to FIG. 5A, a flowchart is provided illustrating a process 500 for computing a confidence value for corrected data within time-series data. Also, referring to FIG. 4, at least a portion of the modules and sub-modules of the data quality-to-KPI predictions confidence engine 440 are also illustrated and discussed with respect to FIG. 5A.

In one or more embodiments, the quality of the original data 504 (that is substantially similar to the original data 422) embedded within the respective original time series data streams 420 is analyzed and a determination is made as to the respective one or more KPIs that are related to the respective original data 504 through a two-step process. Initially, the quality of the original data 504 as data packets are transmitted from the respective sensors of the sensor suite 502 (that is substantially similar to the sensor suite 416) to a data inspection module 510 (resident within the data quality-to-KI predictions confidence engine 440), where the data packets are inspected by a data inspection sub-module 512 embedded within the data inspection module 510. In at least some embodiments, as discussed further, the data inspection module 510 also includes integrated KPI characteristic determination features, thereby avoiding the data inspection sub-module 512 being redundant.

In some embodiments, one or more data packets of original data 504 may include issues that identify the respective data packets as containing potentially faulty data. One such issue may be associated with the sampling frequency. For example, and without limitation, the data inspection sub-module 512 checks the sampling frequency of the sensor suite 502 to determine if multiple sampling frequencies are present in the original data 504, e.g., if there are occasional perturbations in the sampling frequency, and if there are continuous sampling frequency changes. Also, for example, and without limitation, the data inspection sub-module 512 checks the timestamps of the original data 504 to determine if any timestamps are missing in the original data 504, if the original data 504 is missing for a continuous extended duration, and if there are timestamps of varied formats. Moreover, for example, and without limitation, the data inspection sub-module 512 checks for syntactic value issues to determine if supposedly numeric data includes extensive durations of data 504 that is "not-a-number (NaN)" and improper numerical rounding and truncation. In addition, for example, and without limitation, the data inspection sub-module 512 checks for semantic value issues to determine if any of the original data 504 includes anomalous events, and noisy data. Accordingly, the data inspection sub-module 512 examines the original data 504 in the respective original time series data stream 420 and determines if the original data 504 is within predetermined tolerances and if there are any suspected errors in the original data 504, and the nature of the errors.

In some embodiments, there are two modalities, i.e., processing of the original data 504 the system 400 is trying to operate on to determine data quality (as described above), and determining one or more KPI formulations 468 that are planned to be applied on the original data 504. As used herein, the KPI formulations 468 include one or more KPI characteristics 470, where the KPI characteristics 470 also include, without limitation, the details of the formulation 468, e.g., and without limitation, one or more data issues the algorithms of the formulations 468 are directed to, the algorithms themselves, and any parameters and definitions of the respective KPIs 466. The KPIs 466, including the formulations 468, characteristics 470, and measures 472, are stored in the data storage system 408. In some embodiments, both modalities are executed through the data inspection module 510, i.e., the data quality is evaluated through the data inspection sub-module 512 and the KPI formulation characteristic evaluations are executed through a KPI characteristic determination sub-module 514 that is operably coupled to the data inspection sub-module 512. In some embodiments, the KPI characteristic determination sub-module 514 is a separate module operably coupled to the data inspection module 510. Accordingly, the data inspection features and the determination of the relevant KPI formulation characteristics 470 are closely integrated.

In at least some embodiments, at least a portion of such KPI formulation characteristics 470 are typically implemented as algorithms to operate on the incoming original time series data streams 420 to provide a user with the necessary output data and functionality to support the respective KPIs 466. Also, in some embodiments, the KPI formulations 468 are readily located within a KPI formulations sub-module 516 embedded within the KPI characteristic determination sub-module 514, where such KPI formulations 468 may be imported from the data storage system 408. Therefore, as previously described, the original data 504 is initially checked to verify it is within certain tolerances, and then secondly, a determination is made if there is any association of any potentially erroneous data with one or more particular KPIs 466. In one or more embodiments, at least a portion of the collected original data 504 is not associated with any KPIs 466, and therefore, such erroneous original data 504 is not impactful for a given KPI 466. Therefore, in order to execute an initial identification of relevant issues, a simple KPI relevancy test is performed. For example, and without limitation, if one or more particular KPIs 466 use an average-based formulation, and the potentially erroneous data 504 in the respective original time series data streams 420 includes unordered timestamps, it is determined that the unordered timestamps do not create any impact on the respective one or more KPIs 466. Similarly, if one or more particular KPIs 466 are median- or mode-based formulations 468, then the presence of outliers in the respective original time series data streams 420 do not create any impact on the respective KPIs 466. Accordingly, some erroneous data attributes may have no effect on a particular KPI 466, and such data is not relevant for the KPI-related analyses described further herein.

In some embodiments, one further mechanism for determining KPI relevancy that may be employed is to pass at least a portion of the original time series data streams 420 with known non-erroneous data, and, in some embodiments, suspect erroneous data, to one or more respective KPI formulations 468 in the KPI formulations sub-module 516 to generate numerical values therefrom, i.e., to generate original KPI test values therefrom. Specifically, data with no erroneous values may be manipulated to change at least one value to a known erroneous value, thereby generating imputed error-laden data that is also passed to the respective one or more KPI formulations 468 to generate imputed KPI test values therefrom.

Referring to FIG. 6, a textual diagram is presented illustrating an example algorithm 600 for identifying relevant issues. Also referring to FIGS. 4 and 5A, the algorithm 600 is resident within the KPI formulations sub-module 516. The algorithm 600 includes an issue listing operation 602, where a predetermined set of potential data error issues are listed for selection within the algorithm 600, and each potential data error issue includes one or more corresponding models 442. A data identification operation 604 is executed to identify which portion of the original data 504 in the original time series data streams 420 will be analyzed for potential errors, potential data replacement, and confidence determinations of the replacement. In some embodiments, the data quality-to-KPI predictions confidence engine 440 is scalable to examine multiple streams of the original time series data streams 420 simultaneously, including, without limitation, a small fraction of the original data 504 and scaling up to all original data 504 in all original time series data streams 420. The KPI formulations 468 as developed by the user are identified and retrieved in a KPI formulation identification and retrieval operation 606, and the selected original data 504 to be analyzed is passed through the respective KPI formulations 468 in an original data-to-KPI formulation operation 608. The affecting issues from the issue listing operation 602 are cycled through either one at a time or simultaneously in parallel through an affecting issues analysis selection algorithm 610.

In one or more embodiments, a data-to-issues sub-algorithm 612 is executed that includes injecting at least a portion of the original data 504 with imputed erroneous data through an imputed data injection operation 614. In some embodiments, the injected errors may include, without limitation, random selection of some of the original data 504 in the original time series data stream 420 and removal of such random data to determine if missing data issues are relevant. In addition, the injected errors may include, without limitation, random selection of known non-erroneous original data 504 and injecting values that are known to extend beyond established tolerances to determine if outlier issues are relevant. The imputed data is transmitted through the KPI formulations 468 to determine imputed KPI test values through a KPI test values generation operation 616. The imputed KPI test values from the operation 616 are compared to the original KPI test values from the operation 608 through a KPI value comparison operation 618, and an issue determination operation 620 is executed as a function of the comparison operation 618. In some embodiments, if there is sufficient similarity imputed KPI test values and the original KPI test values, then the original data 504, i.e., the issues associated with the original data 504, are labeled as relevant to the respective KPIs 466 through the KPI formulations 468 thereof. If there is insufficient similarity between the imputed KPI test values and the original KPI test values, then the original data 504, including the aforementioned issues, are labeled as not relevant to the respective KPIs 466 through the KPI formulations 468 thereof. Upon executing the sub-algorithm 612 through exhaustion of the issues from the issue listing operation 602, the sub-algorithm 612 is ended 622 and the algorithm 600 is ended 624. Accordingly, in order to determine if there are any relevant relationships between the suspected, or otherwise identified, data errors in the original time series data stream 420, data with predetermined errors embedded therein is used for determining if there is any relevant and appreciable effect of the erroneous data on the respective KPI formulations 468.

Referring again to FIGS. 4 and 5A, in at least some embodiments, a KPI characteristic determination is performed. The basis for each KPI characteristic determination, sometimes referred to as KPI characterization, includes one or more KPIs 466. For example, and without limitation, the basis for a business is one or more business-specific KPIs 466, and for a private residence, the basis is one or more residential-specific KPIs 466. In some embodiments, any entity-based KPIs are used that would enable the time-series data replacement confidence system 400 disclosed herein are used.

In some embodiments, the KPIs 466 are predetermined and described, e.g., as explicit measurements of success, or lack thereof, toward attaining specific business goals. In some embodiments, the KPIs 466 are developed as a function of collection and analysis of business data to determine otherwise unidentified measurements for attaining business goals, thereby facilitating the identification of one or more additional KPIs 466. Accordingly, regardless of the origins, the KPIs 466 are available to match the associated inherent properties within the respective KPI formulations 468 to the respective issues found in the original data 504, and in some instances, facilitate identification of the relevant issues.

In one or more embodiments, the KPI characteristic determination operations are executed in situ as the original data 504 is transmitted into the data inspection module 512. Moreover, since the nature of the original data issues generated in real time are not known in advance, the data inspections and KPI characteristic determinations are to be made dynamically in real time. Therefore, the determinations of the respective KPIs 466 with the respective characteristics 470 that are embedded within the respective formulations 468 of the respective KPIs 466 are executed in conjunction with the determinations of the issues affecting the incoming original data 422. At least a portion of the KPI characteristic determinations include determining the nature of the respective KPIs 466 associated with the original data 504.

In some embodiments, a portion of the incoming original data 504 will not be associated with any KPIs 466, and this data will not be operated on any further for this disclosure and any embedded issues will be either ignored and the data processed as is, or an issue notification will be transmitted to the user in one or more manners, e.g., and without limitation, through one or more of the output devices 450. In other embodiments, the relationships of the incoming original data and the associated KPI formulations 468 will be further determined.

In embodiments, the KPI formulations 468 are grouped into one of two types of formulations, i.e., "observable box" and "unobservable box" formulations. In some embodiments of both of the observable box and unobservable box KPI formulations, the associated algorithms examine whether the appropriate KPI characteristic formulation includes one or more analyses of the surrounding original data values with respect to the data with issues, including, without limitation, one or more of maximum value determinations, minimum value determinations, mean value determinations, median value determinations, and other statistical determinations, such as, and without limitation, mode value determinations and standard deviation analyses.

In at least some embodiments, the observable box KPI formulations 468 are available for inspection, i.e., the details are observable, and the KPI characteristic determination sub-module 514 includes a observable box sub-module 518. Referring to FIG. 7, a textual diagram is provided illustrating an example algorithm 700 for observable box KPI analysis. Also referring to FIGS. 4 and 5A, the algorithm 700 is resident within the observable box sub-module 518. The algorithm 700 includes a KPI formulation presentation operation 702, where the characteristics of the respective KPI formulations 468 are clearly articulated to the user and the system 400 as described herein. The algorithm also includes a parse tree operation 704, where the KPI characteristics 470 are translated into am Abstract Syntax Tree (AST) to generate the KPI characteristics 470 as an AST representation of the source code in the respective programming language such that when the details of the KPI 466 are available the various code blocks may be parsed and understandable as nodes in the AST. As shown in FIG. 7, the algorithm 700 includes a first sub-algorithm, i.e., a function analysis operation 706 that is configured to determine if a particular node in the AST is a function, e.g., and without limitation, a mathematical operation as discussed further.

In the embodiment shown in FIG. 7, a second sub-algorithm, i.e., a median determination operation 708 is executed for those KPI formulation characteristics 470 that define a median value determination of the original data 504 such that a KPI characteristic assignment operation 710 is executed, where in this case, the assigned KPI characteristic 470 is "median" for the subsequent portions of the process 500. The median determination operation 708 is then ended 712. In some embodiments, the algorithm includes one or more further portions of the first sub-algorithm for other types of KPI characteristics, e.g., and without limitation, maximum value determinations, minimum value determinations, mean value determinations, and other statistical determinations, such as, and without limitation, mode value determinations and standard deviation analyses. In the illustrated embodiment of FIG. 7, a third sub-algorithm, i.e., a mean determination operation 714 is executed for those KPI formulation characteristics 470 that define a mean value determination of the original data 504 such that a KPI characteristic assignment operation 716 is executed, where in this case, the assigned KPI characteristic 470 is "mean" for the subsequent portions of the process 500. The mean determination operation 714 is then ended 718. Any remaining possible KPI formulation characteristics 470 as described above are determined similarly. Upon completion of the function analysis operation 706, is ended 720.

Further, in one or more embodiments, as shown in FIG. 7, the algorithm 700 includes a fourth sub-algorithm, i.e., a binary operations analysis operation 722 that is configured to determine if a particular node in the AST is a binary operation, e.g., and without limitation, a mathematical operation that uses two elements, or operands, to create another element. In the embodiment shown in FIG. 7, a fifth sub-algorithm, i.e., a division sub-algorithm 724 is executed for those KPI formulation characteristics 470 that define a division operation of the original data 504. The division operation includes a sixth sub-algorithm, i.e., an integrated summation operand and len operand, or integrated mean sub-algorithm 726 where the len operand, or operation provides the number of items being summed, such that a KPI characteristic assignment operation 728 is executed, where in this case, the assigned KPI characteristic 470 is "mean" for the subsequent portions of the process 500. The integrated mean sub-algorithm 726 is ended 730, the division sub-algorithm 724 is ended 732 and the binary operation sub-algorithm 722 is ended 734. An open sub-algorithm 736 is shown if further operations beyond the function and binary operations are required by the user. The parse tree operation 704 is ended 738 when all of the respective observable box operations associated with the respective KPIs 466 are identified.

In at least some embodiments, the unobservable box KPI formulations 468 are opaque as to the operations and algorithms contained therein, for example, and without limitation, the respective unobservable box algorithms and operations may be proprietary in nature and the respective users require some level of secrecy and confidentiality for the contents thereof. In some embodiments, such unobservable box formulations may take the form of an application programming interface (API). Therefore, one mechanism for determining the KPI formulation characteristics 470 within the unobservable box KPI formulations 468 includes repeated sampling of the original data 504 to test the original data 504 through simulations of the formulations. Accordingly, the KPI characteristic determination sub-module 514 includes a unobservable box sub-module 520.

Referring to FIG. 8, a textual diagram is provided illustrating an example algorithm 800 for unobservable box KPI analysis. Also referring to FIGS. 4 and 5A, the algorithm 800 is resident within the unobservable box sub-module 520. In at least some embodiments, the algorithm 800 includes a data subset generation operation 802, where the original data 504 is divided into K subsets of data, each subset having M data points therein, where M is a predetermined constant. For example, and without limitation, a string of 100 data points may be divided into five subsets of 20 points each. Generation of such subsets facilitates determinations if a particular error is recurring, or is a single instance of an error, i.e., a one-off error. The algorithm 800 also includes a KPI formulation characteristics listing operation 804 that is configured to identify all of the potential KPI formulation characteristics 470 that may be used within the unobservable box computations. As previously described herein, such KPI formulation characteristics 470 include, without limitation, one or more of mean value determinations ("mean"), median value determinations ("median"), mode value determinations ("mode"), maximum value determinations ("max"), minimum value determinations ("min"), and other statistical determinations, such as, and without limitation, standard deviation analyses. Each of these KPI formulation characteristics 470 will be examined through one or more unobservable box model-based simulations to identify potential issues of erroneous data, where the unobservable box model-based simulations are not directly related to the simulation modeling discussed further herein with respect to snapshot generation.

In one or more embodiments, an original KPI valuation operation 806 is executed, where each data element of each data subset is processed through using the respective unobservable box model, where such model is not yet determined. As used herein, the term "data point" and the term "data element" are used interchangeably. Therefore, in an embodiment of 100 data points, or data elements of original data 504, there will be 100 respective KPI values, i.e., 20 KPI values for each of 5 subsets of original data 504. As such, the 100 process data elements are processed through the unobservable box formulations, whatever they may be, to generate 100 original KPI values through the actual unobservable box formulations. Also, in some embodiments, a correlations operation 808 is executed that includes a simulation/correlation sub-algorithm 810. Specifically, in one or more embodiments, a simulated KPI valuation operation 812 is executed, where each data element of the original data 504 is analyzed through using a respective model of each KPI formulation characteristic 470 identified in the KPI formulation characteristics listing operation 804. An original KPI value-to-simulated KPI value correlation operation 814 is executed where each value of the original KPI values is compared to each respective simulated KPI value generated through each model of the KPI formulation characteristics 470 identified from the KPI formulation characteristics listing operation 804. As such, for the embodiment with 100 data elements, there will be 100 correlations for each KPI formulation characteristics 470 identified from the KPI formulation characteristics listing operation 804. In some embodiments, a statistical evaluation of each set of correlated data elements is executed to determine a strength of the correlation, e.g., and without limitation, weak correlation and strong correlation, where definitions of each correlation may be established by the user. A strong correlation indicates the simulated KPI formulations are following the actual unobservable box KPI formulations 468. A weak correlation indicates the simulated KPI formulations are not aligned with the actual unobservable box KPI formulations 468. Once the processing through the correlations is completed, the simulation/correlation sub-algorithm 810 is ended 816. The algorithm 800 for unobservable box KPI analysis includes a KPI formulation characteristic selection operation 818 where the most highly correlated characteristic is selected. Once the unobservable box KPI formulations are determined, the algorithm 800 ends 820.

The output 522 of the data inspection module 510 includes the analysis of the original data 504 to determine if there are any data errors therein, and the affected KPI formulation characteristics 470, if any. If there are no errors, the respective data is no longer processed through the process 500, where the operations within the KPI characteristic determination sub-module 514 are not invoked, and there is not output 522. If there is a data error in the original data 504, the output 522 is transmitted to a determination operation 524 that determines 524 if the data issues are relevant for the identified KPI based on the analyses of the KPI characteristic determination sub-module 514. As previously discussed, if there is no relationship between the respective original data 504 and the KPI formulation characteristics 470, a "No" determination is generated and no further action is taken on the issue-laden data per this disclosure. The user, if so desired, may elect to take other action on the data errors. For a "Yes" determination, i.e., for those data error issues associated with the original data 504 that have a relationship with a KPI (both supplied by the user), through the respective properties, an output 526 of the determination operation 524 is transmitted for further processing, where the output 526 is substantially similar to the output 522. Accordingly, when the characteristics 470 of the KPI formulations 468 for erroneous data, whether observable box or unobservable box, are determined to adversely impact a related KPI, the error is further analyzed such that it can be properly classified and the subsequent optimizations can be performed.

Figure 5B:
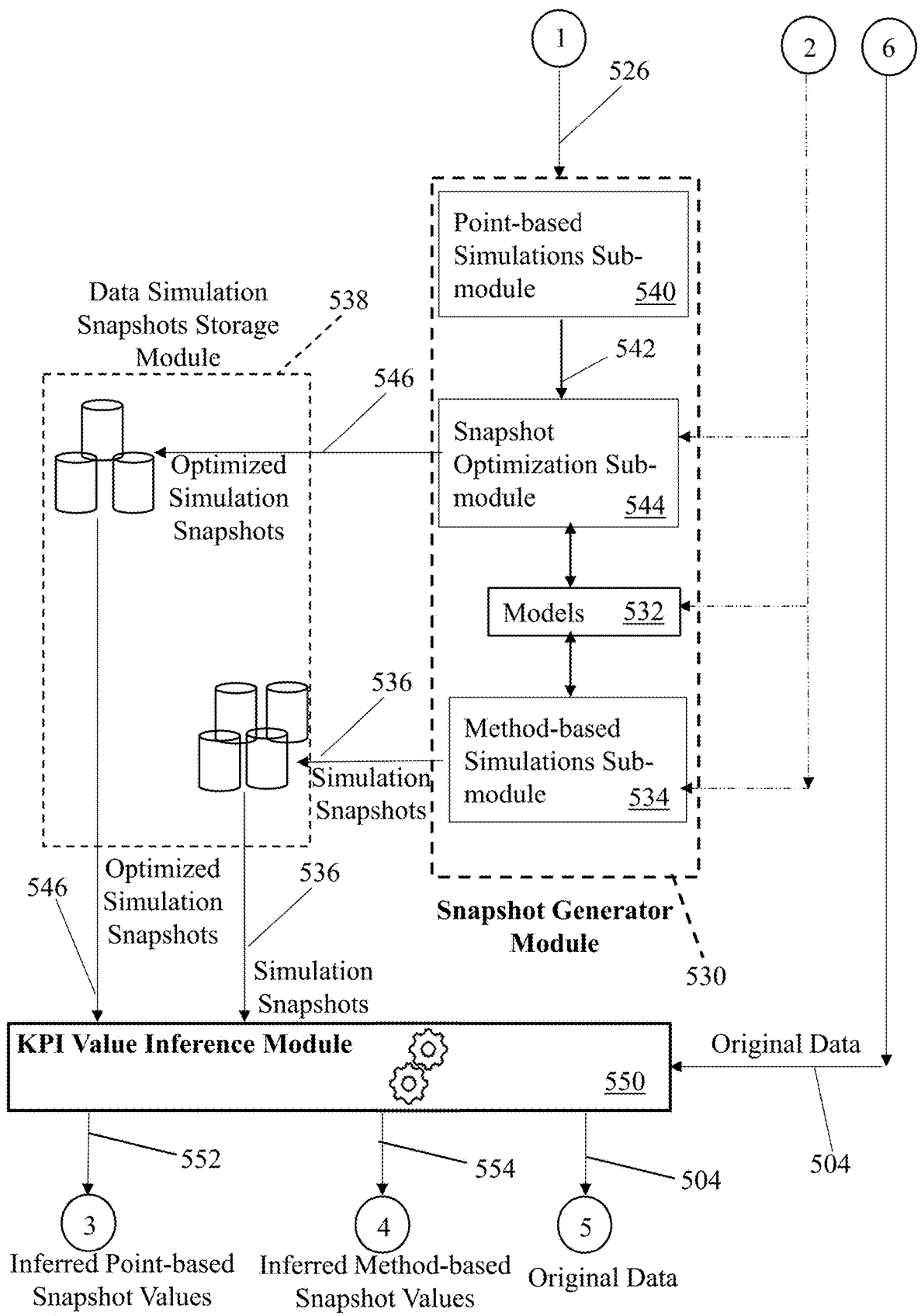
FIG. 5B is a continuation of the flowchart shown in FIG. 5A illustrating a process for computing a confidence value for corrected data within time-series data, in accordance with some embodiments of the present disclosure.

Referring to FIG. 5B, a continuation of the flowchart shown in FIG. 5A, is provided further illustrating the process 500 for computing a confidence value for corrected data within time-series data. Also referring to FIG. 4, in one or more embodiments, the process 500 further includes transmitting the output 526 to a snapshot generator module 530. The snapshot generator module 530 receives the output 526 of the data inspection module 510 that includes the erroneous data with the known embedded issues and identification of the respective KPI formulation characteristics 470. The snapshot generator module 530 is configured to generate snapshots of simulated data through simulation of the respective data values through one or more models that are placed into production to facilitate the simulation of the original data 504.

Figure 9:
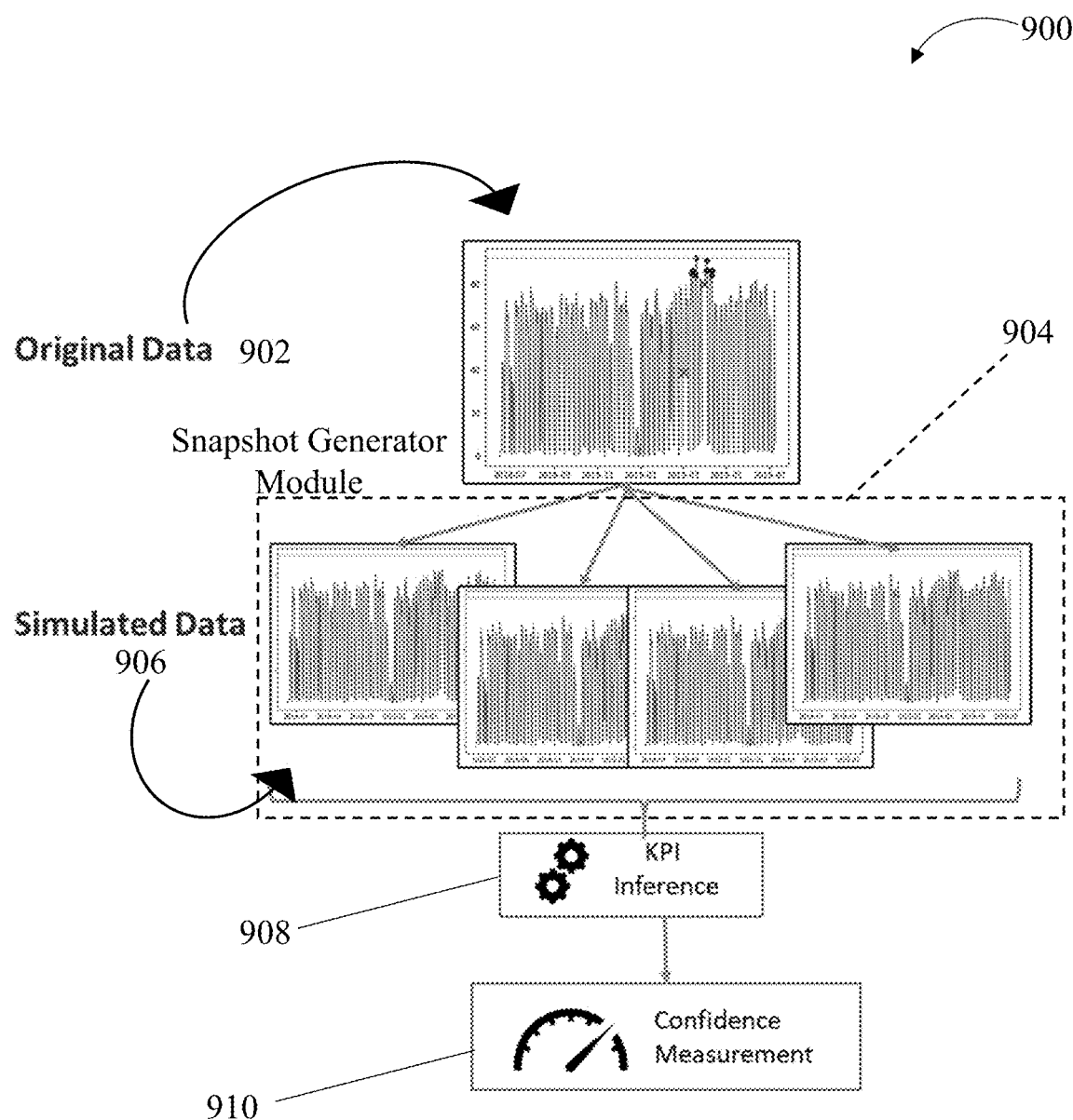
FIG. 9 is a schematic diagram illustrating a portion of a process for snapshot simulation, in accordance with some embodiments of the present disclosure.

Referring to FIG. 9, a schematic diagram is provided illustrating a portion of a process 900 for snapshot simulation using a snapshot generator module 904 that is substantially similar to the snapshot generator module 530. Also referring to FIG. 5B, the original data 902 that is substantially similar to the original data 504 that is transmitted through output 526 to the snapshot generator module 904 is further evaluated. The original data 902 (with the erroneous data issues embedded therein) is processed through a plurality of models 532 (that are substantially similar to the models 442 shown in FIG. 4) to generate a plurality of simulation snapshots 906 that include simulated data as discussed further herein. The simulated data snapshots 906 are subsequently used for KPI inference 908 and confidence measurement 910 that are shown in FIG. 9 for context only.

Referring again to FIGS. 4 and 5B, in some embodiments, method-based simulations and point-based simulations are used. While either of the simulations may be used regardless of the nature of the issues in the erroneous data, including both simultaneously, in some embodiments, the selection of which of the two simulations is based on the nature of the original data quality issues, and in some embodiments, the selection may be based on predetermined instructions generated by the user. However, in general, the method-based simulations are better configured for processing missing value issues and the point-based simulations are better configured for processing outlier value issues. For example, in some embodiments, previous trial runs by a user may have indicated that missing data may be determined based on if data is missing for a continuous extended duration or syntactic value issues exist, i.e., supposedly numeric data includes extensive durations of data that is NaN or improper numerical rounding or truncation is determined. As such, the method-based simulations may provide the better analyses for the aforementioned conditions. Outlier value issues may be determined if there are semantic value issues, i.e., some of the data includes anomalous events or consistently or patterned noisy data. As such, the point-based simulations may provide the better analyses for the aforementioned conditions. Similarly, if a user determines that it may be indeterminate if the method-based or point-based simulations provide better simulations for the specified conditions, for those conditions when either may provide better simulations, and as described above, both simulation methods may be used.

In one or more embodiments, the snapshot generator module 530 is configured to use method-based simulations to analyze for one or more methods of remediation, where each method of remediation may include, for example, and without limitation, algorithms for determining means, medians, etc. at least partially as a function of the respective KPI 466 that is affected by the data errors. However, the methods of remediation are not necessarily limited to the KPI formulation characteristics 470. The snapshot generator module 530 includes a method-based simulations sub-module 534 that may be used whether or not the KPI formulation characteristics 470 are unobservable box or observable box.

Figure 10:
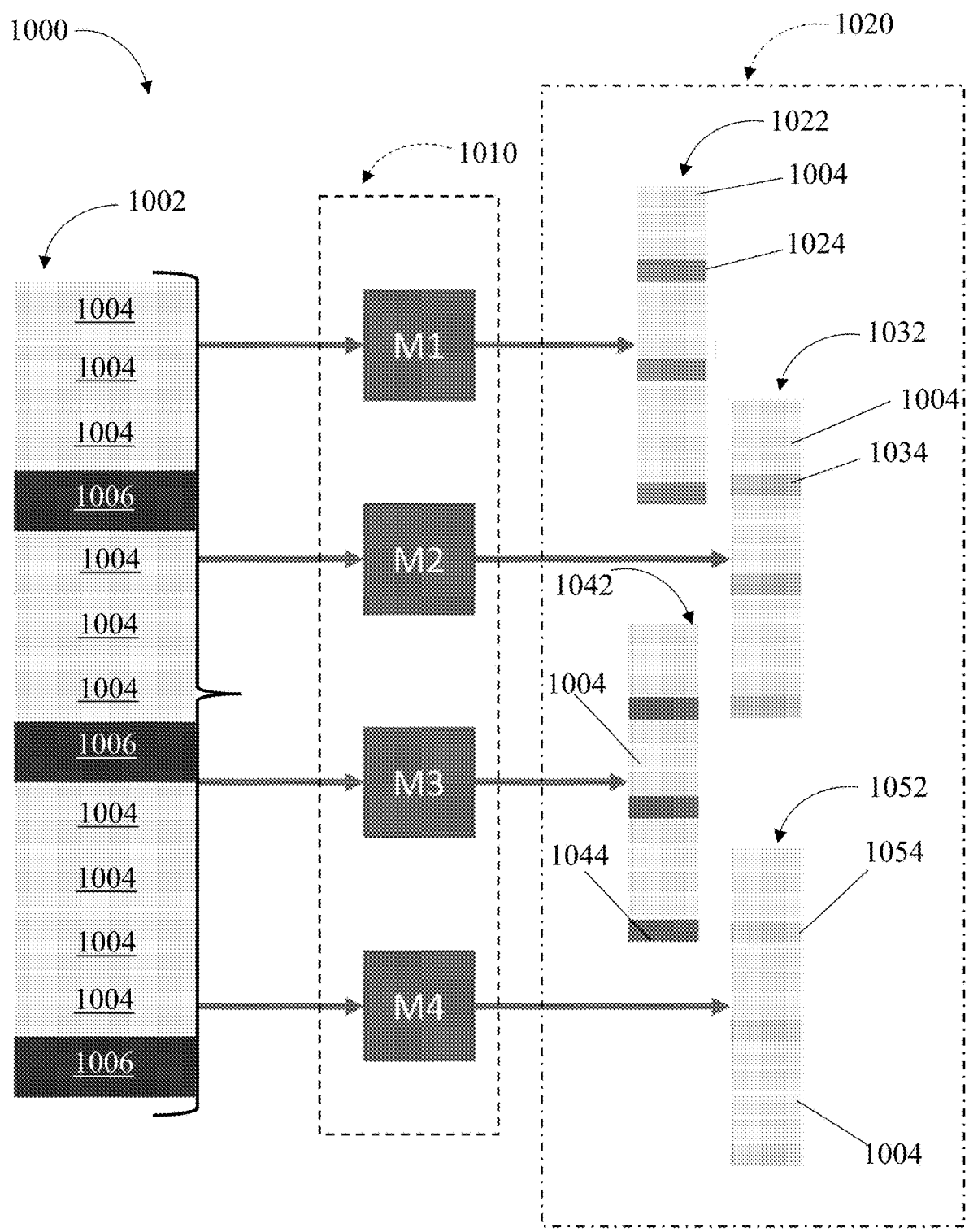
FIG. 10 is a schematic diagram illustrating a process for method-based simulations, in accordance with some embodiments of the present disclosure.

Referring to FIG. 10, a schematic diagram is presented illustrating a process 1000 for generating method-based simulations. Also referring to FIGS. 4 and 5B, the method-based simulations are generated through method-based simulations sub-module 534. A portion of the output 526 of the data inspection module 510 that includes the erroneous data with the embedded issues and identification of the respective KPI formulation characteristics 470 is shown as a snippet 1002 with ten instances of non-erroneous data 1004 and three instances of erroneous data 1006. The data snippet 1002 is transmitted to a plurality of methods of remediation 1010, including methods of remediation M1, M2, M3, and M4, where each method of remediation M1-M4 is associated with a different respective model 532, and the number four is non-limiting. Each method of remediation M1-M4 includes generation of one or more imputed values that are included in the respective simulation snapshot as potential solutions to, or replacements for, the erroneous values if that particular method of remediation were to be used. Since there are no predetermined notions as to which of the methods of remediation M1-M4 provides the best, or most correct, potential replacement values for the particular present erroneous data 1006, the plurality of models 532 are used, where each model 532 is used to execute the respective method of remediation M1-M4. In some embodiments, the method-based simulations sub-module 534 is communicatively coupled to the KPI formulations sub-module 516 for ready access to the KPI formulations 468 resident therein.

In at least some embodiments, a plurality of simulated data snapshots 1020 are generated. For example, in the illustrated embodiment, the method of remediation M1 employs the respective model 532 to calculate imputed values 1024 in a simulated data snapshot 1022. In some embodiments, the fraction of non-erroneous data 1004 used to compute the imputed values 1024 for the erroneous data 1006 depends on the particular remediation technique associated with the respective method of remediation M1. For example, if it is determined to replace a missing value with the mean of all values, then a substantially complete set of respective non-erroneous data 1004 is used in the respective method of remediation M1. Alternatively, if only the surrounding three values of non-erroneous data 1004 are used to compute the missing value, i.e., erroneous data 1006, then only those surrounding values of non-erroneous data 1004 are used by the respective method of remediation M1. Similarly, simulated data snapshots 1032. 1042, and 1052 are generated through respective methods of remediation M2-M4, including respective imputed values 1034, 1044, and 1054. Since the methods of remediation M1-M4 are different, it is expected that the respective imputed values 1024, 1034, 1044, and 1054 are different as well. Referring to FIGS. 4 and 5B, the simulated data snapshots 1022, 1032. 1042, and 1052 are shown as output 536 from the method-based simulations sub-module 534, where the output 536 is transmitted to a data simulations snapshots storage module 538 that, in some embodiments, resides within the data storage system 408.

In at least one embodiment, such as the exemplary embodiment, the three instances of erroneous data 1006 are substantially identical. In at least one embodiment, each of the instances of erroneous data 1006 are different. Therefore, since multiple models 532 and methods of remediation M1-M4 are used for all of the erroneous data 1006, generating multiple respective imputed values 1024, 1034, 1044, and 1054 for each different error is facilitated. Accordingly, method-based simulations in the form of methods of remediation M1-M4 are used to generate one or more simulation snapshots 1022, 1032, 1042, and 1052 of the non-erroneous original data 1004 and imputed values 1024, 1034, 1044, and 1054 for each erroneous original data value 1006, where each of imputed values 1024, 1034, 1044, and 1054 indicates what the data value would look like when the particular method of remediation M1-M4 is used, each of imputed values 1024, 1034, 1044, and 1054 is a product of a different method of remediation M1-M4.

In at least some embodiments, collection of the original time-series data streams 420 through the sensor suite 416 includes use of heuristically-based features that facilitate determinations of patterns in the data elements as they are collected. Under some circumstances, one or more instances of the original data 422 may appear to be incorrect due to the respective data elements exceeding a threshold value that is based on a probability of what the data element value should be as a function of the established data patterns. For example, and without limitation, an apparent data excursion, i.e., a data spike upwards or downwards, may be generated through either an erroneous data packet or as a function of an accurate portrayal of what is occurring in real time. Therefore, the snapshot generator module 530 is further configured to use point-based simulations to analyze the errors to determine if apparently erroneous data is actually erroneous data, i.e., the snapshot generator module 530 includes a point-based simulations sub-module 540.

Figure 11:
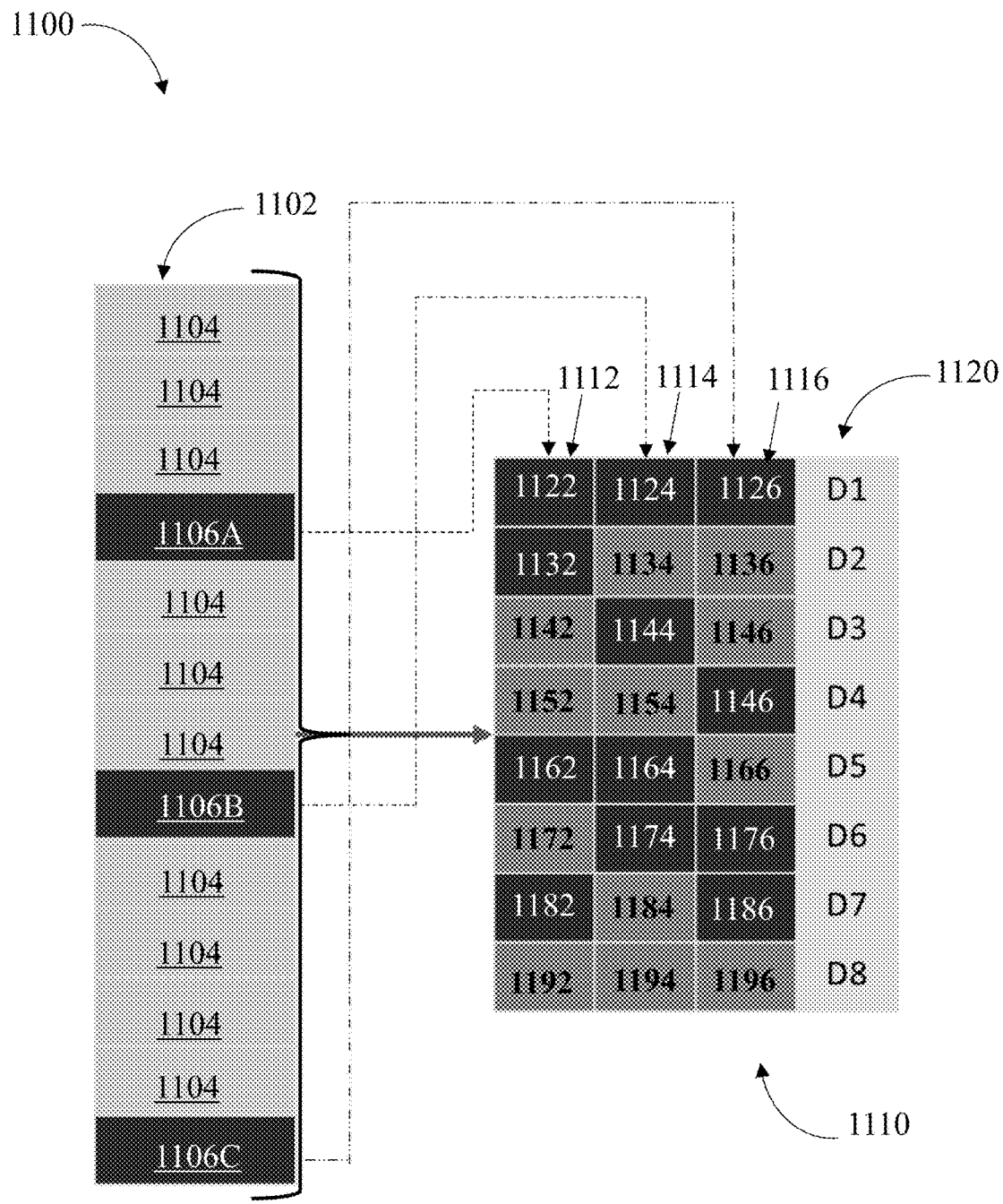
FIG. 11 is a schematic diagram illustrating a process for point-based simulations, in accordance with some embodiments of the present disclosure.

Referring to FIG. 11, a schematic diagram is provided illustrating a process 1100 for point-based simulations. Also referring to FIGS. 4 and 5B, the point-based simulations are generated through the point-based simulations sub-module 540. A portion of the output 526 of the data inspection module 510 that includes the erroneous data with the embedded issues and identification of the respective KPI formulation characteristics 470 is shown as a data snippet 1102 with ten instances of non-erroneous data points 1104 and three instances of suspect potentially erroneous data points 1106. The three instances of suspect potentially erroneous data points 1106 are individually referred to as 1106A, 1106B, and 1106C, and collectively as 1106. In one or more embodiments, the data snippet 1102, including the known correct original data, i.e., non-erroneous data points 1104 and the suspect potentially erroneous data points 1106, is combined into a matrix 1110 of configurations to initiate determinations of probabilities of whether the values of the suspect potentially erroneous data points 1106 are correct or erroneous. As shown, the matrix 1110 in based on the three suspect potentially erroneous data points 1106, i.e., with $2^3$, or eight possible combinations of the three suspect potentially erroneous data points 1106. The matrix 1110 is configured with three columns 1112, 1114, and 1116, i.e., one for each of the suspect potentially erroneous data points 1106A, 1106B, and 1106C, respectively. The resultant eight rows, individually referred to as D1 through D8 and collectively as 1120, include the available combinations of the three suspect potentially erroneous data points 1106.

Each of the three suspect potentially erroneous data points 1106 is individually inferred as either a discrete "correct" or a discrete "erroneous," and the potentially erroneous data values are then referred to as "inferred data points" to distinguish them from the known correct original data, i.e., non-erroneous data points 1104. As shown in FIG. 11, the inferred erroneous data points are collectively referred to as 1130. Those inferred erroneous data points 1130 associated with suspect potentially erroneous data point 1106A are individually shown and referred to as 1122, 1132, 1162, and 1182 in the column 1112. Also, those inferred erroneous data points 1130 associated with suspect potentially erroneous data point 1106B are individually shown and referred to as 1124, 1144, 1164, and 1174 in the column 1114. Further, those inferred erroneous data points 1130 associated with suspect potentially erroneous data point 1106C are individually shown and referred to as 1126, 1146, 1176, and 1186 in the column 1116.

In a similar manner, as shown in FIG. 11, the inferred correct data points are collectively referred to as 1140. those inferred correct data points 1140 associated with suspect potentially erroneous data point 1106A are individually shown and referred to as 1142, 1152, 1172, and 1192 in column 1112. Also, those inferred correct data points 1140 associated with suspect potentially erroneous data point 1106B are individually shown and referred to as 1134, 1154, 1184, and 1194 in column 1114. Further, those inferred correct data points 1140 associated with suspect potentially erroneous data point 1106C are individually shown and referred to as 1136, 1146, 1166, and 1196 in column 1116. A simulation snapshot 542 of the matrix 1120 is executed.

Therefore, the first row D1 represents all three suspect potentially erroneous data points 1106 as inferred erroneous data points 1130. Similarly, the eighth row D8 represents all three suspect potentially erroneous data points 1106 as inferred correct data points 1140. The second, third, and fourth rows D2, D3, and D4, respectively, represent only one of the three suspect potentially erroneous data points 1106 as inferred erroneous data points 1130 and two of the three suspect potentially erroneous data points 1106 as inferred correct data points 1140. The fifth, sixth, and seventh rows D5, D6, and D7, respectively, represent two of the three suspect potentially erroneous data points 1106 as inferred erroneous data points 1130 and only one of the three suspect potentially erroneous data points 1106 as inferred correct data points 1140.

As such, the inferred erroneous data points 1130 and inferred correct data points 1140 have an original data value as transmitted and a discrete inferred label as either correct or erroneous. The remainder of the analysis focuses exclusively on the inferred erroneous data points 1130 and inferred correct data points 1140. Specifically, the full range of all of the possible combinations of the inferred data points 1130 and 1140 as shown as D1 through D8 are collected in the aforementioned simulation snapshot 542 for further evaluation. The generation of all possible combinations of discrete "correct" labels, i.e., the inferred correct data points 1140 and discrete "erroneous" labels, i.e., the inferred erroneous data points 1130 and subsequent aggregation of such facilitates further determinations of "best" actions, and whether those actions are to correct erroneous data or to accept correct data. These operations consider the accepted inaccuracies associated with original data in the data snippet 1102 that may or may not be erroneous, through determining the probabilities of one or more of the suspect potentially erroneous data values being "correct" or "erroneous." In each of the combinations D1 through D8, it is assumed that some of the suspect potentially erroneous values 1106 are wrongly identified as erroneous and some are correctly identified as erroneous. So, for each combination D1 through D8, the erroneous values are replaced with an imputed value based on a predetermined remediation method, similar, and not limited to, to those discussed with respect to FIG. 10. Therefore, each combination D1 through D8 has a different set of correct and incorrect data points and require different imputed values based on the predetermined remediation technique.

As described above, the point-based simulations are better configured for processing outlier value issues and outlier issues will be used to further describe the exemplary embodiment in FIG. 11. As described above, patterns may be discerned in the original data 504 including the data snippet 1102 and a probability of what the respective data element values should be as a function of the established data patterns. The discrete "erroneous" inferred data points 1130 therefore have a probability of misclassification as erroneous with a percent assurity assigned thereto. The probabilities of each of the three suspect potentially erroneous values 1106 are used to determine if the values 1106 are erroneous or not. As the varying eight combinations D1 through D8 are evaluated, the probability of each of D1 through D8 being true is determined and those rows D1 through D8 that have the highest probability of being true are submitted for further analysis. The total probability of D1 through D8 is 100%. For example, and without limitation, given the heuristic analysis of each point 1122, 1124, and 1126 in D1, and the associated summed probabilities thereof, it may be determined that all three points in D1 being erroneous has a relatively low probability as does row D8 (all three values being correct). These two rows D1 and D8 will receive no further consideration. Notably, for those embodiments where the row D8, with no erroneous values, has the highest probability of being correct, no further analysis need be executed and the values 1106 are not corrected through the downstream operations as further described. Accordingly, the combinations of values that have the higher probabilities of being true are processed further.

In general, the total number of each possible combination of the discrete "correct" and "erroneous" inferred data points 1130 and 1140 grows exponentially with the number of inferred data points (i.e., $2^x$, where x=the number of inferred data values), and generating all possible combinations and processing them can be time and resource intensive. Each combination of inferred data points is a potential simulation, and processing each of the combinations as a potential simulation merely increases the processing overhead. Therefore, the described possible combinations D1 through D8 of inferred data points 1130 and 1140 are further considered; however, the possible combinations of inferred data points 1130 and 1140 are "pruned" such that only a subset of all possible combinations are further considered. As described above, the initial pruning occurs as low-probability combinations of potentially erroneous values are eliminated from further processing.

The point-based simulations sub-module 540 is operatively coupled to a snapshot optimization sub-module 544. In such embodiments, snapshot optimization features are employed through using the KPI formulation characteristics 470 determined as previously described, whether or not the KPI formulation characteristics 470 are unobservable box or observable box. For example, and without limitation, KPI formulation characteristics 470 for maximum, minimum, mean, and median analyses may be used to filter the simulations of the inferred data points 1130 and 1140. Therefore, the snapshot optimization module 544 is communicatively coupled to the KPI formulations sub-module 516. In general, only those combinations of inferred data points that successfully pass through the pruning process will survive to generate the respective simulations of the suspect point values through the models and generate the respective simulation snapshots with the non-erroneous original data and imputed values for the identified erroneous data, where a portion of the suspected erroneous point values may in fact not be erroneous and will not require replacement thereof.

Referring to FIG. 12, a textual diagram is provided illustrating an example algorithm 1200 for a snapshot optimizer that is configured for execution within the snapshot optimization sub-module 544 (as shown in FIG. 5B). Referring to FIGS. 4, 5A, 5B, and 11, the algorithm 1200 includes an operation to determine 1202 the KPI formulation characteristic 470 as previously determined by the KPI characteristic determination sub-module 514 and as described with respect to FIGS. 6-8. The data as represented in the exemplary embodiment as the matrix 1120, that is, the data embedded in the remaining rows that have not been eliminated due to low probabilities as described above, is further analyzed to produce the pruning effect as described herein through a data presentation operation 1204. As described above, the exemplary embedment includes analyzing outliers. In one or more embodiments, a first sub-algorithm, i.e., a "maximum" sub-algorithm 1206 is considered for execution. In the event that the previously determined KPI formulation characteristic 470 is a maximum characteristic, then a modified data operation 1208 is executed through one or more of models 532. The modified data operation 1208 includes determining if the suspect potentially erroneous data 1106 are outliers within rising peaks of the data snippet 1102 of the original data 504. If the data snippet 1102 does not exhibit a rising trend, thereby eliminating any chance of a rising peak, the algorithm 1200 proceeds to the next set pf operations. If the data snippet 1102 does exhibit a rising trend, the affected outliers are replaced with values that provide a smoothing effect on the rising trend per modified data operation 1208 with the previously described probability values providing some level of assurance that the suspected erroneous data was in fact erroneous. These data points are selected for simulation through one or more models 532. Once the data replacement identifications, or "fixes," are executed, the maximum sub-algorithm 1206 is ended 1210.

A second sub-algorithm, i.e., a "minimum" sub-algorithm 1212 is considered for execution. In the event that the previously determined KPI formulation characteristic 470 is a minimum characteristic, then a modified data operation 1214 is executed through one or more of models 532. The modified data operation 1214 includes determining if the suspect potentially erroneous data 1106 are outliers within falling peaks of the data snippet 1102 of the original data 504. If the data snippet 1102 does not exhibit a falling trend, thereby eliminating any chance of a falling peak, the algorithm 1200 proceeds to the next set pf operations. If the data snippet 1102 does exhibit a falling trend, the affected outliers are replaced with values that provide a smoothing effect on the falling trend per modified data operation 1214 with the previously described probability values providing some level of assurance that the suspected erroneous data was in fact erroneous. These data points are selected for simulation through one or more models 532. Once the data repairs, or "fixes," are executed, the minimum sub-algorithm 1212 is ended 1216.

A third sub-algorithm, i.e., a "mean" sub-algorithm 1218 is considered for execution. In the event that the previously determined KPI formulation characteristic 470 is a mean characteristic, then a modified data operation 1220 is executed through one or more models 532. The modified data operation 1220 includes determining if the suspect potentially erroneous data 1106 are outliers through considering all the issues i.e., all of the affected suspect potentially erroneous data 1106 and the respective probabilities discussed above and group them into one or more clusters of potentially erroneous data values based on the proximity of the related respective values to each other. In some embodiments, there may be multiple clusters of the potentially erroneous data values, indicative of the mean characteristic used as the basis for the clustering. A cluster consideration operation 1222 is executed where a collection of representative points, e.g., and without limitation, a mean value from each cluster, are considered as representative points for simulation. Once the data selections for simulation are executed through one or more models 532, the mean sub-algorithm 1218 is ended 1224.

A fourth sub-algorithm, i.e., a "median" sub-algorithm 1226 is considered for execution. In the event that the previously determined KPI formulation characteristic 470 is a median characteristic, then a modified data operation 1228 is executed through one or more of the models 532. The modified data operation 1228 includes determining if the suspect potentially erroneous data 1106 are outliers through considering all the issues i.e., all of the affected suspect potentially erroneous data 1106 and the respective probabilities discussed above. If the suspect potentially erroneous data 1106 are in fact outliers, and since median-based KPIs are not affected by the value perturbations, no further action is taken on the data, and the median sub-algorithm 1226 ends 1230. In some embodiments, the sub-algorithms 1206, 1212, 1218, and 1226 may be executed simultaneously in parallel. The output of the snapshot optimization module 544 shown as optimized simulated data snapshot 546 is transmitted to the data simulations snapshots storage module 538 that, in some embodiments, resides within the data storage system 408. Accordingly, a plurality of simulations snapshots 536 and 546 are generated for further processing, where the simulation snapshots 536 and 546 are generated in a manner to significantly reduce the otherwise large number of imputed values.

Continuing to refer to FIGS. 4, 5B, 10, and 11, in at least some embodiments, the simulation snapshots 536 and 546 created by the snapshot generator modules, whether method-based or point-based, are transmitted to a KPI value inference module 550. As discussed above, each simulation snapshot of the simulation snapshots 536 and 546 includes the non-erroneous original data (e.g., 1004 and 1104) and imputed values for the established erroneous data (e.g., 1006 and 1106). Each of the imputed values and the associated original data are presented to the respective KPI formulation 468 to generate a predicted replacement value, i.e., an inferred snapshot value for each of the imputed values in the respective simulation snapshots 536 and 546. As such, the original data 504 is also transmitted to the KPI value inference module 550.

Figure 13:
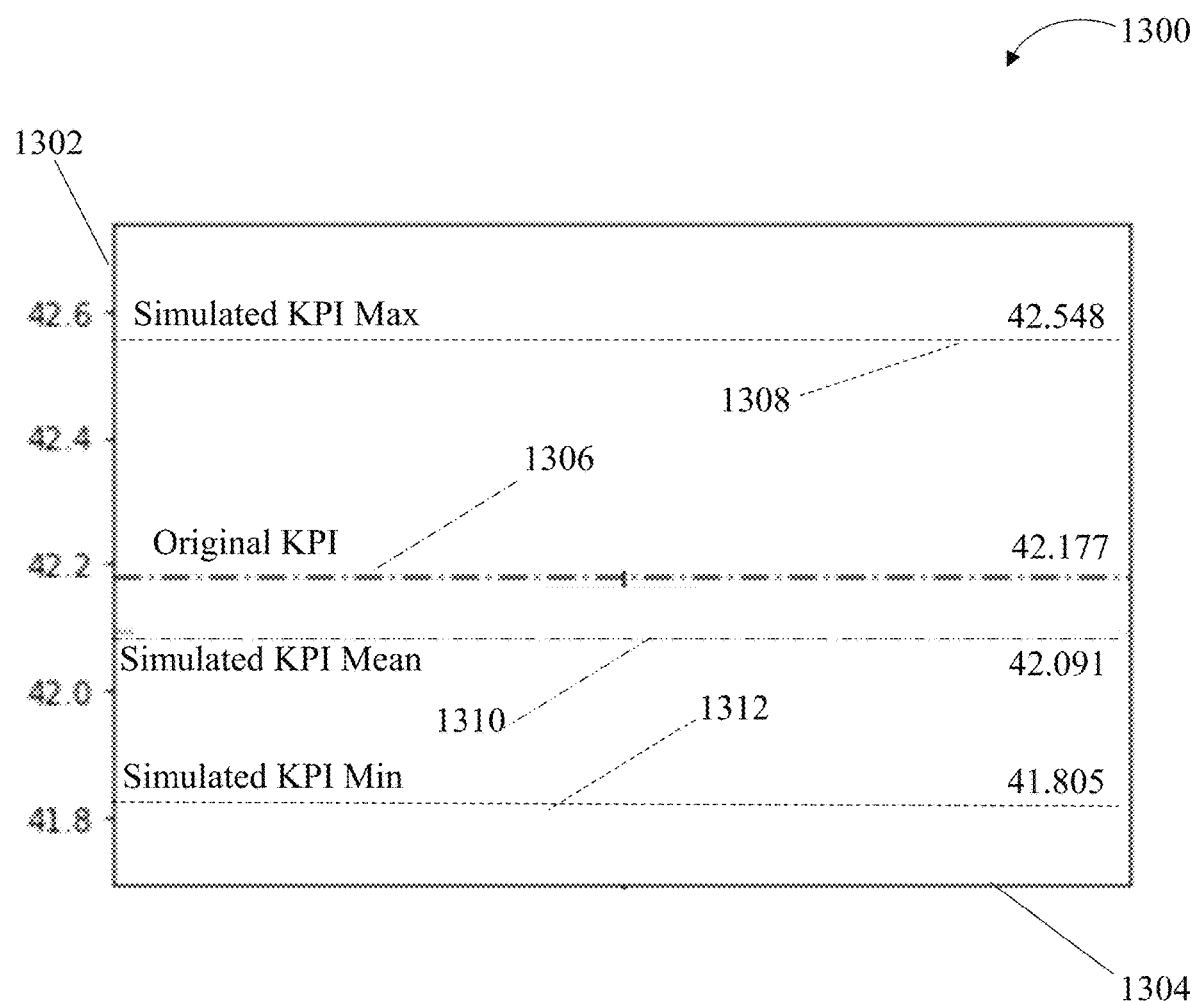
FIG. 13 is a graphical diagram illustrating a KPI value inference, in accordance with some embodiments of the present disclosure.

Referring to FIG. 13, a graphical diagram is presented illustrating at least a portion of a KPI value inference process 1300. Also referring to FIGS. 4 and 5B, the inferred snapshot values for the simulation snapshots 536 and 546 are based on the respective KPI formulation 468 and in the context of the non-erroneous original data on the time-series data stream. Therefore, for each simulation snapshot 536 and 546 transmitted to the KPI value inference module 550, a predicted replacement value, i.e., an inferred snapshot value is generated. FIG. 13 shows an abscissa (Y-axis) 1302 and an ordinate (X-axis) 1304. The Y-axis 1302 is shown extending from 41.8 to 42.6, where the values are unitless. The X-axis 1304 is shown valueless and unitless. The nature of the values is not important; however, the process 1300 shows a portion of the values determined as a function of the KPI formulation characteristics 470 that are presented with the simulation snapshots 536 and 546. The original KPI value 1306, i.e., the value generated by processing the suspect erroneous data through the respective KPI formulations 468, is presented as a reference, where the respective value is 42.177. The Simulated KPI Max snapshot 1308 presents an inferred snapshot value of 42.548, the Simulated KPI Mean snapshot 1310 presents an inferred snapshot value of 42.091, and the Simulated KPI Min snapshot 1312 presents an inferred snapshot value of 41.805. These inferred snapshot values will be used in the discussions of the subsequent portions of the process 500.

Figure 5C:
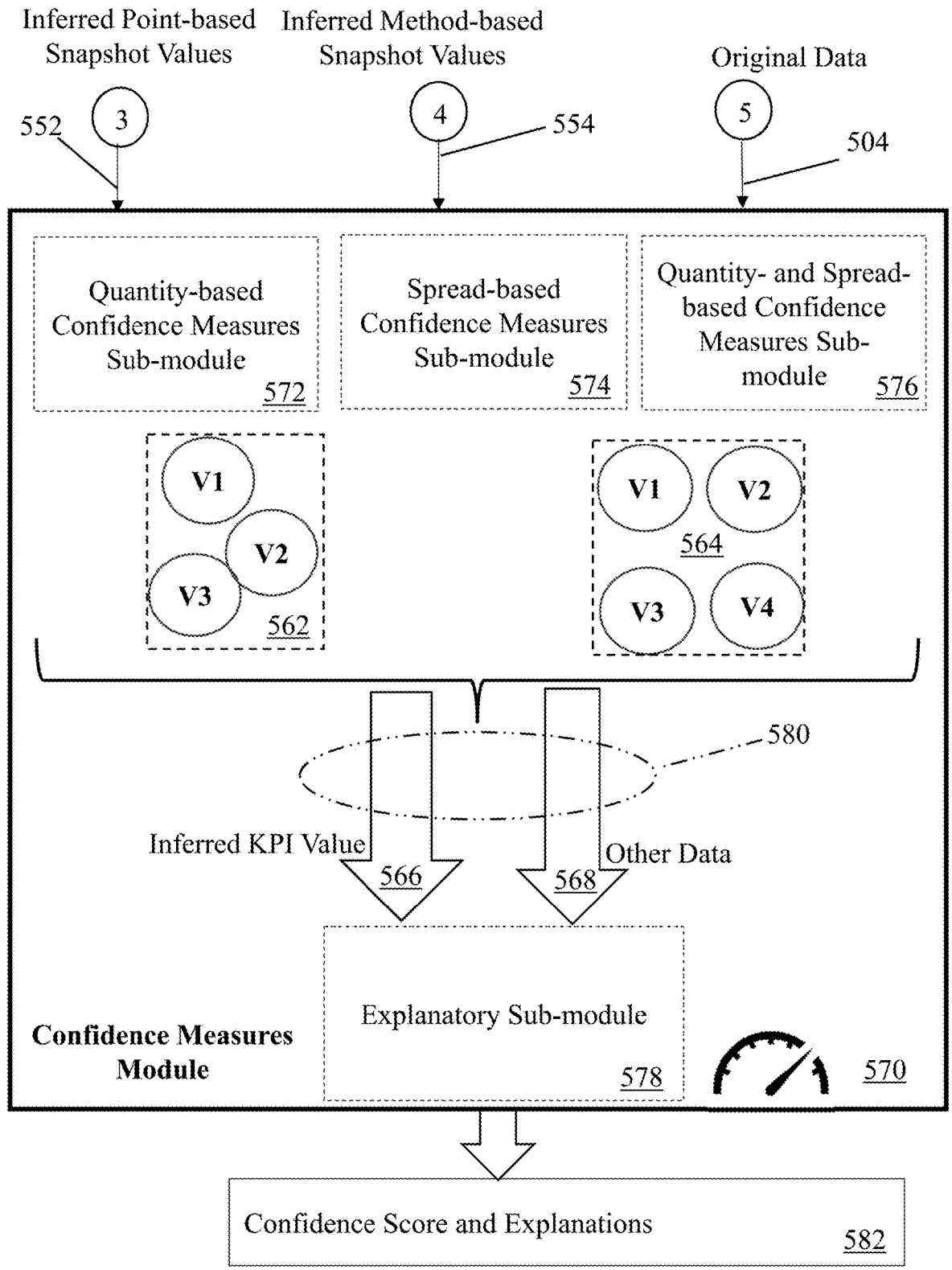
FIG. 5C is a continuation of the flowchart shown in FIGS. 5A and 5B illustrating a process for computing a confidence value for corrected data within time-series data, in accordance with some embodiments of the present disclosure.

Referring to FIG. 5C, a continuation of the flowchart shown in FIGS. 5A and 5B is provided illustrating the process 500 for computing a confidence value for corrected data within time-series data. Also referring to FIG. 5B, the outputs of the KPI value inference module 550 includes inferred point-based snapshot values 552, inferred method-based snapshot values 554, and original data 504 are transmitted to a confidence measures module 570 that is communicatively coupled to the KPI value inference module 550. In general, for each respective inferred snapshot value for the erroneous data that is generated from the simulation snapshots in the KPI value inference module 550, within the confidence measures module 570, the inferred snapshot values are individually scored. The respective scoring includes generating scored inferred point-based snapshot values 562, i.e., inferred point-based snapshot values 552 with respective confidence values. In addition, the respective scoring generates scored inferred method-based snapshot values 564, i.e., inferred method-based snapshot values 554 with respective confidence values. The generation of the confidence values is discussed further below. The best analytical score is selected, and the respective inferred snapshot value is now elevated to the selected KPI value to replace the erroneous data, where the selected KPI value is referred to as the inferred KPI value 566. Accordingly, the inferred KPI value 566 is that value selected from one or more predicted replacement values (i.e., the scored inferred snapshot values 562 and 564) to resolve the potentially erroneous data instances.

In some embodiments, the confidence measures module 570 includes a plurality of additional sub-modules to facilitate generating the confidence values and the details and evidence to support such values. In some of those embodiments, three confidence measures sub-modules are used, i.e., a quantity-based confidence measures sub-module 572, a spread-based confidence measures sub-module 574, and a quantity- and spread-based confidence measures sub-module 576.

The quantity-based confidence measures sub-module 572 is configured to take into consideration the magnitude of the values obtained from the KPI value inference module 550 and generate the associated confidence measures information, including the respective confidence scores. For example, and without limitation, whether the magnitude of the KPI value is 50 or 1050, the confidence in the resultant KPI value may differ in light of the additional data and circumstances. The spread-based confidence measures sub-module 574 considers the range in which the simulated values lie and generate the associated confidence measures information, including the respective confidence scores. Instead of the absolute magnitude of the KPI values, the spread-based confidence measures use the statistical properties like mean, min, max, and standard deviation of the KPI values, and hence are substantially unaffected by the magnitude. The quantity- and spread-based confidence measures sub-module 576 considers the magnitude as well as the range of values to generate the associated confidence measures information, including the respective confidence scores. In some embodiments, all three of the sub-modules 572, 574, and 576 are used in parallel and the results of each are considered and valued for selection. In some embodiments, only one or two of the sub-modules 572, 574, and 576 are selected based on the nature of the incoming inferred KPI value 566 and other data 568 (discussed further below).

Figure 14:
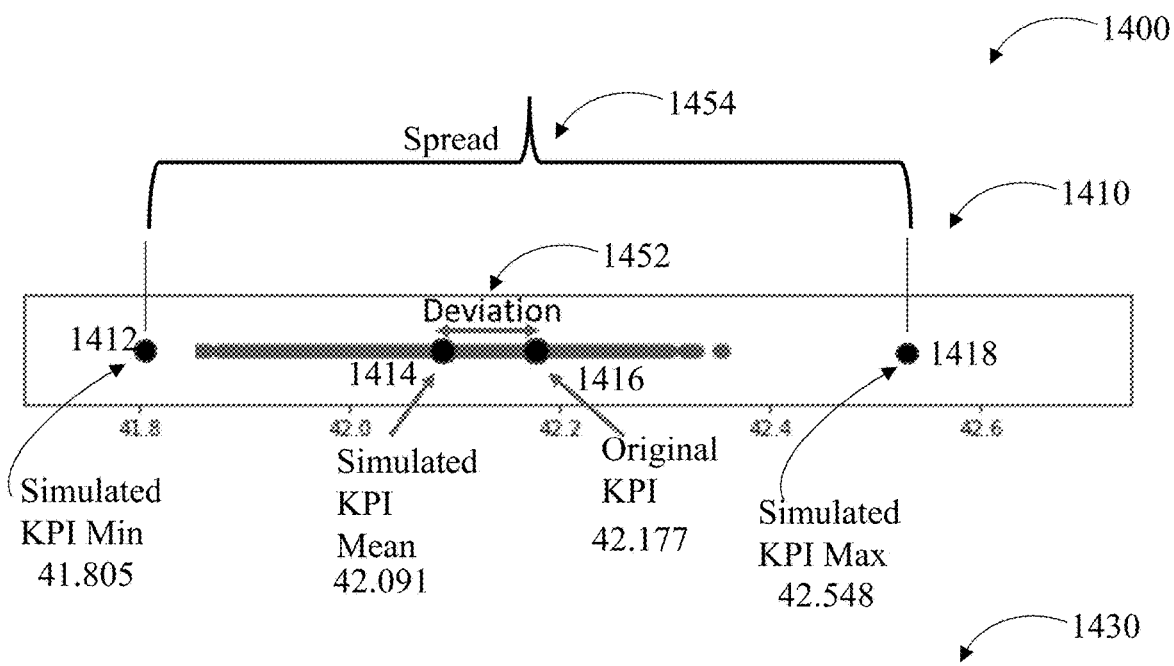
FIG. 14 is a graphical/textual diagram illustrating generation of confidence measures, in accordance with some embodiments of the present disclosure.

Referring to FIG. 14, a graphical/textual diagram is provided illustrating generation 1400 of the numerical confidence measures. Also referring to FIGS. 5B and 5C, the confidence values of the inferred point-based snapshot values 552 and the inferred method-based snapshot values 554 are generated. A linear graphical representation 1410 is presented with the four values shown in FIG. 13. Specifically, other data 568 (shown in FIG. 5C) such as, and without limitation, the Simulated KPI Min snapshot value 1412 with the inferred snapshot value of 41.805, the Simulated KPI Mean snapshot value 1414 with the inferred snapshot value of 42.091, the original KPI value 1416 of 42.117, and the simulated KPI Max snapshot value 1418 with the inferred snapshot value of 42.548 are shown. Also presented in FIG. 14 is a first set of confidence measure valuation algorithms, i.e., max deviations confidence measure algorithms 1430. The confidence measure 1A algorithm determines the relationship between the maximum variance of the inferred snapshot values 1412, 1414, and 1418 as a function of the original KPI value 1416. The confidence measure 1B algorithm determines the relationship between the maximum variance of the inferred snapshot values 1412, 1414, and 1418 as a function of the Simulated KPI Mean snapshot value 1414. Further presented in FIG. 14 is a second set of confidence measure valuation algorithms, i.e., mean deviations confidence measure algorithms 1440. The confidence measure 2A algorithm determines the relationship of the variance between the original KPI value 1416 and the Simulated KPI Mean snapshot value 1414 as a function of the original KPI value 1416. The confidence measure 2B algorithm determines the relationship of the variance between the original KPI value 1416 and the Simulated KPI Mean snapshot value 1414 as a function of the Simulated KPI Mean snapshot value 1414. Moreover, FIG. 14 presents a spread-based measures algorithm 1450, i.e., a confidence measure 3 algorithm that evaluates the deviation 1452 between the original KPI value 1416 and the Simulated KPI Mean snapshot value 1414 as a function of the spread 1454 between the Simulated KPI Max value 1418 and the Simulated KPI Min value 1412. The max deviations confidence measure algorithms 1430 for the confidence measures 1A and 1B and mean deviations confidence measure algorithms 1440 for the confidence measures 2A and 2B are resident within the quantity-based confidence measures sub-module 572 and quantity- and spread-based confidence measures sub-module 576. Similarly, the confidence measure 3 algorithm of the spread-based measures algorithm 1450 is resident within the spread-based confidence measures sub-module 574 and the quantity- and spread-based confidence measures sub-module 576.

Figure 15:
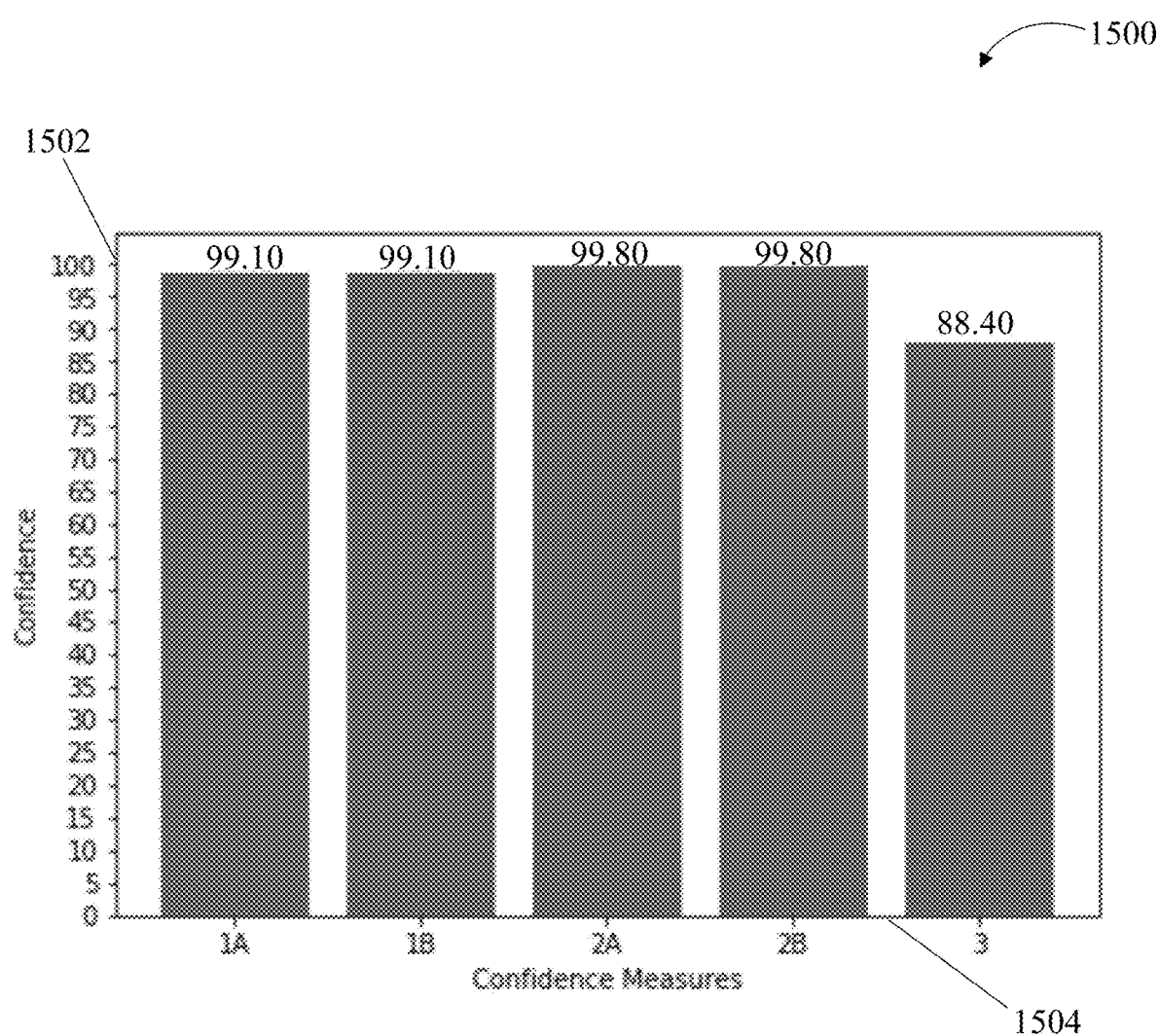
FIG. 15 is a graphical diagram illustrating confidence measures, in accordance with some embodiments of the present disclosure.

Also, referring to FIG. 15. a graphical diagram, i.e., a column chart 1500 is provided illustrating confidence measures with values calculated from the algorithms and values provided in FIG. 14, with a comparison therebetween. The column chart 1500 includes an ordinate (Y-Axis 1502) representative of the value of the calculated confidence values extending between 0% and 100%. The column chart 1500 also includes an abscissa (X-Axis) 1504 that identifies the confidence measures 1A, 1B, 2A, 2B, and 3. The confidence values of the confidence measures 2A and 2B provide the highest values of 99.8. Therefore, the Simulated KPI Mean snapshot value 1414 provides the best confidence value for the erroneous data. In at least some embodiments, the Simulated KPI Mean snapshot value 1414 is the inferred KPI value 566 for the present example.

In general, the confidence measures module 570 compares the inferred snapshot values 552 and 554 generated through one or more of the aforementioned simulations with the respective original erroneous data. At least one of the results of the comparison is a confidence value, in the format of a numerical value, for each of the inferred snapshot values 552 and 554 as applied to the respective snapshot of the data indicative of a level of confidence that the inferred snapshot values 552 and 554 are suitable replacements for the erroneous data. A relatively low confidence value indicates that either the respective inferred snapshot values 552 and 554, including the resultant inferred KPI value 566, should not be used, or used with caution. A relatively high confidence value indicates that the respective inferred snapshot values 552 and 554, including the resultant inferred KPI value 566, should be used. The threshold values for the associated confidence values may be established by the user, and may also be used to train one or more models, both conditions to facilitate fully automating the selection. Furthermore, the subsequent actions may be automated. For example, and without limitation, for confidence values below a predetermined threshold, the inferred KPI value 566 will not be passed for further processing within the native application, e.g., the process control system 410, utilizing the original data stream 420. Similarly, for confidence values above a predetermined threshold, the inferred KPI value 566 will be passed for further processing within the native application utilizing the original data 422. Accordingly, the systems and methods as described herein correct the issues with the erroneous data in the original data stream 420 automatically in a manner that prevents inadvertent actions or initiates proper actions as the conditions and correct data dictate.

Referring again to FIG. 5C, the confidence measures module 570 includes an explanatory sub-module 578 configured to receive confidence-based data 580 from the confidence measures sub-modules 572, 574, and 576. The confidence-based data 580 includes, without limitation, the inferred KPI value 566 and its associated confidence value, the respective information associated with the selection of the inferred KPI value 566 and additional information to generate an explanation of the inferred KPI value 566 that was selected, including the other data 568 that includes, without limitation, all of the inferred snapshot values 552 and 554, including the respective confidence values. In addition, since it is possible that the confidence value for the predicted, i.e., inferred KPI value 566 is not 100%, the explanatory sub-module 578 provides an explanatory basis for the resolution of the one or more potentially erroneous data instances through providing the details and evidence of the selection of the particular scored inferred snapshot values 562 and 564 as the inferred KPI value 566. The explanatory sub-module 578 provides such details including, and without limitation, the types of issues detected in the dataset, the number and nature of the simulations generated, the statistical properties of the scores obtained from various simulations, and a comparison of the scores. Accordingly, the confidence measures module 570 generates various confidence measurements for the scored inferred snapshot values 562 and 564 and the information to facilitate the user understanding the properties of the distribution of the scored inferred snapshot values 562 and 564 to further provide clarity of the selection of the respective inferred KPI values 566, thereby generating a confidence score and explanation 582 as an output of the process 500.

Also, referring to FIG. 16, a textual diagram is provided illustrating confidence measures explanations 1600. The data provided in the confidence measures explanations 1600 is substantially self-explanatory.

The system, computer program product, and method as disclosed herein facilitate overcoming the disadvantages and limitations of inadvertently processing erroneous time series data, and potentially encountering inadvertent consequences therefrom. For example, as the respective data is generated, and for a given business KPI, the automated system and method described herein decides whether a data quality issue is impactful for the respective business KPI. In addition, the system and method described herein identifies the related business KPI's properties (or characteristics) so that relevant data issues can be identified, and optimizations can be performed whether the exact KPI formulations are explicitly visible or not, i.e., regardless of whether the formulations are observable box or unobservable box in nature. Moreover, the system and method described herein resolves the identified data issues by selecting a scored prediction of a replacement value for the erroneous data. Furthermore, the system and method described herein optimize selection of the possible replacement values to efficiently use system resources. Moreover, the scored predictions are accompanied with quantified confidence values with an explanation of the confidence values with respect to the confidence measures inferred and the reasons for the values. Accordingly, as described herein, data quality issues are filtered based on the analysis of given KPI and data is modified to mitigate the quality issues considering various scenarios to compute its impact on the measurement of given KPI and additionally measure the confidence of the predicted replacement values.

In addition, the features of the system, computer program product, and method as disclosed herein may be extended beyond implementation in exclusively business-based embodiments. Non-business implementations are also envisioned to overcome similar disadvantages and limitations of inadvertently processing erroneous time series data, and potentially encountering inadvertent consequences therefrom. Specifically, any computer-implemented process that relies on time-series data to execute the respective functions properly may be improved through implementation of the features in this disclosure. For example, and without limitation, any use of time-series data collected from IoT devices, including residential and vehicular users, will avoid inadvertent and unnecessary automated actions through replacement of missing data values with the highest confidence. Specifically, for residential users, erroneous data falsely indicating low voltage from the respective electric utility may be prevented from inadvertently and unnecessarily activating low-voltage protective circuitry that would otherwise disrupt satisfactory electric power delivery to the respective residence. In such an implementation, one respective KPI may be to maintain continuity of electric power to the residential user. Also, specifically, for vehicular users, erroneous data falsely indicating excessive propulsion mechanism temperatures may be prevented from inadvertently and unnecessarily activating automated emergency engine shutdowns. In such an implementation, one respective KPI may be to maintain continuity of propulsion to the vehicular user.

Therefore, the embodiments disclosed herein provide an improvement to computer technology by providing a mechanism for efficiently, effectively, and automatically identifying issues associated with erroneous time series data, determining whether a data quality issue is impactful for a given business KPI through identifying the business KPI's characteristics so that relevant data issues can be identified, and optimizations can be performed whether the exact KPI characteristics are openly defined or not, i.e., whether the KPI formulations are observable box or unobservable box in nature, and resolving the identified data issues while presenting a confidence analysis of the examined potential resolutions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising: one or more processing devices and at least one memory device operably coupled to the one or more processing devices, the one or more processing devices are configured to: identify one or more potentially erroneous data instances in a time series data stream; determine one or more predicted replacement values for the one or more potentially erroneous data instances in the time series data stream; determine a confidence value for each predicted replacement value of the one or more predicted replacement values; resolve the one or more potentially erroneous data instances in the time series data stream with one predicted replacement value of the one or more predicted replacement values; and generate an explanatory basis for the resolution of the one or more potentially erroneous data instances in the time series data stream.

2. The system of claim 1, wherein the one or more processing devices are further configured to:
identify one or more key performance indicators (KPIs) impacted through the one or more potentially erroneous data instances.

3. The system of claim 2, wherein the one or more processing devices are further configured to:
determine one or more KPI formulation characteristics are associated with the one or more potentially erroneous data instances, wherein each KPI of the one or more KPIs includes one or more formulations thereof, each formulation of the one or more formulations includes one or more characteristics thereof.

4. The system of claim 3, wherein the one or more processing devices are further configured to:

analyze KPI formulations that are observable, thereby analyzing observable box formulations; and analyze KPI formulations that are non-observable, thereby analyzing unobservable box formulations.

5. The system of claim 3, wherein the one or more processing devices are further configured to:

generate one or more simulation snapshots, wherein each simulation snapshot of the one or more simulation snapshots includes one or more imputed values, wherein each predicted replacement value of the one or more predicted replacement values is at least partially based on the one or more imputed values and the one or more KPI formulation characteristics.

6. The system of claim 5, wherein the one or more processing devices are further configured to:

generate a plurality of simulation snapshots through point-based simulations comprising:

generate a plurality of inferred data points from the one or more potentially erroneous data instances comprising alternately assigning one of a discrete correct label and a discrete erroneous label to each potentially erroneous data instance of the one or more potentially erroneous data instances;

generate a set of all possible combinations of the plurality of inferred data points;

determine probabilities of the plurality of inferred data points actually being erroneous; and generate the plurality of point-based simulation snapshots on only a subset of the set of all possible combinations of the plurality of inferred data points, wherein each point-based simulation snapshot of the plurality of point-based simulation snapshots includes the one or more imputed values; and generate a plurality of simulation snapshots through method-based simulations comprising:

generate the one or more imputed values for each potentially erroneous data instance, wherein each imputed value of the one or more imputed values is generated through a respective remediation operation.

7. The system of claim 6, wherein the one or more processing devices are further configured to:

generate the subset of the set of all possible combinations of the plurality of inferred data points comprising employment of snapshot optimization features through using the KPI formulation characteristics.

8. The system of claim 1, wherein the one or more processing devices are further configured to:

resolve the one or more potentially erroneous data instances and generate the explanatory basis for the resolution of the one or more potentially erroneous data instances through one or more of quantity-based confidence measures and spread-based confidence measures.

9. A computer program product, comprising: one or more computer readable storage media; and program instructions collectively stored on the one or more computer storage media, the program instructions comprising: program instructions to identify one or more potentially erroneous data instances in a time series data stream; program instructions to determine one or more predicted replacement values for the one or more potentially erroneous data instances in the time series data stream; program instructions to determine a confidence value for each predicted replacement value of the one or more predicted replacement values; program instructions to resolve the one or more potentially erroneous data instances in the time series data stream with one predicted replacement value of the one or more predicted replacement values; and program instructions to generate an explanatory basis for the resolution of the one or more potentially erroneous data instances in the time series data stream.

10. The computer program product of claim 9, further comprising:

program instructions to identify one or more key performance indicators (KPIs) impacted through the one or more potentially erroneous data instances.

11. The computer program product of claim 10, further comprising:

program instructions to determine one or more of KPI formulation characteristics are associated with the one or more potentially erroneous data instances, wherein each KPI of the one or more KPIs includes one or more formulations thereof, each formulation of the one or more formulations includes one or more characteristics thereof.

12. The computer program product of claim 11, further comprising:

program instructions to generate one or more simulation snapshots, wherein each simulation snapshot of the one or more simulation snapshots includes the one or more imputed values, wherein each predicted replacement value of the one or more predicted replacement values is at least partially based on the one or more imputed values and the one or more KPI formulation characteristics.

13. A computer-implemented method comprising: identifying one or more potentially erroneous data instances in a time series data stream; determining one or more predicted replacement values for the one or more potentially erroneous data instances in the time series data stream; determining a confidence value for each predicted replacement value of the one or more predicted replacement values; resolving the one or more potentially erroneous data instances in the time series data stream with one predicted value of the one or more predicted values; and generating an explanatory basis for the resolution of the one or more potentially erroneous data instances in the time series data stream.

14. The method of claim 13, further comprising:

identifying one or more key performance indicators (KPIs) impacted through the one or more potentially erroneous data instances.

15. The method of claim 14, wherein each KPI of the one or more KPIs includes one or more formulations thereof, each formulation of the one or more formulations includes one or more characteristics thereof, the method further comprising:

determining one or more of the KPI formulation characteristics are associated with the one or more potentially erroneous data instances.

16. The method of claim 15, wherein determining the one or more KPI formulation characteristics comprises:

analyzing KPI formulations that are observable, thereby analyzing observable box formulations; and analyzing KPI formulations that are non-observable, thereby analyzing unobservable box formulations.

17. The method of claim 15, wherein determining the one or more predicted replacement values comprises:

generating one or more simulation snapshots, wherein each simulation snapshot of the one or more simulation snapshots includes the one or more imputed values, wherein each predicted replacement value of the one or more predicted replacement values is at least partially based on the one or more imputed values and the one or more KPI formulation characteristics.

18. The method of claim 17, further comprising one or more of:

generating a plurality of simulation snapshots through point-based simulations comprising:
generating a plurality of inferred data points from the one or more potentially erroneous data instances comprising alternately assigning one of a discrete correct label and a discrete erroneous label to each potentially erroneous data instance of the one or more potentially erroneous data instances;
generating a set of all possible combinations of the plurality of inferred data points;
determining probabilities of the plurality of inferred data points actually being erroneous; and
generating the plurality of point-based simulation snapshots on only a subset of the set of all possible combinations of the plurality of inferred data points, wherein each point-based simulation snapshot of the plurality of point-based simulation snapshots includes the one or more imputed values; and generating a plurality of simulation snapshots through method-based simulations comprising:
generating the one or more imputed values for each potentially erroneous data instance, wherein each imputed value of the one or more imputed values is generated through a respective remediation operation.

19. The method of claim 18, further comprising:
generating the subset of the set of all possible combinations of the plurality of inferred data points comprising employing snapshot optimization features through using the KPI formulation characteristics.

20. The method of claim 13, wherein resolving the one or more potentially erroneous data instances and generating the explanatory basis comprises:
using one or more of quantity-based confidence measures and spread-based confidence measures.

* * * * *